United States Patent
Li et al.

(10) Patent No.: US 12,056,125 B2
(45) Date of Patent: Aug. 6, 2024

(54) DATABASE PROCESSING METHOD AND APPARATUS

(71) Applicants: Huawei Technologies Co., Ltd., Shenzhen (CN); Tsinghua University, Beijing (CN)

(72) Inventors: Guoliang Li, Beijing (CN); Xiang Yu, Beijing (CN); Di Yang, Beijing (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 69 days.

(21) Appl. No.: 17/860,906

(22) Filed: Jul. 8, 2022

(65) Prior Publication Data
US 2022/0365933 A1 Nov. 17, 2022

Related U.S. Application Data

(63) Continuation of application No. PCT/CN2021/070816, filed on Jan. 8, 2021.

(30) Foreign Application Priority Data

Jan. 10, 2020 (CN) .......................... 202010029386.4

(51) Int. Cl.
*G06F 16/2453* (2019.01)
*G06F 16/22* (2019.01)

(52) U.S. Cl.
CPC .... *G06F 16/24544* (2019.01); *G06F 16/2246* (2019.01); *G06F 16/24545* (2019.01)

(58) Field of Classification Search
CPC .......... G06F 16/24544; G06F 16/2246; G06F 16/24545

(Continued)

(56) References Cited

U.S. PATENT DOCUMENTS

5,671,403 A * 9/1997 Shekita ............. G06F 16/24537
707/999.005
6,980,981 B2 * 12/2005 Beavin ............. G06F 16/24544
707/999.102

(Continued)

FOREIGN PATENT DOCUMENTS

CN 103377237 A 10/2013
CN 103678589 A 3/2014

(Continued)

OTHER PUBLICATIONS

Li Guo-Liang et al., "A Survey of Machine Learning Based Database Techniques," Chinese Journal of Computer, vol. 43, No. 11, Total 31 pages (Nov. 2020). With an English Abstract.

(Continued)

*Primary Examiner* — Giovanna B Colan
(74) *Attorney, Agent, or Firm* — Leydig, Voit & Mayer, Ltd.

(57) ABSTRACT

A database processing method and an apparatus are provided, and may be applied to a database system. A tree structure is used to represent a join order and used as an input of a neural network, and different first attribute matrices are allocated to different brother nodes in the input tree structure. This helps the neural network comprehensively learn information about the join order, obtain representation information capable of differentiating the join order from another join order, and predict costs of the join order accurately based on the obtained representation information of the join order. Then, an optimizer selects a join order with lowest costs for a query statement based on the costs predicted by a cost prediction module.

20 Claims, 18 Drawing Sheets

(58) Field of Classification Search
USPC ......................................................... 707/714
See application file for complete search history.

(56) References Cited

U.S. PATENT DOCUMENTS

| | | | |
|---|---|---|---|
| 9,720,934 | B1 | 8/2017 | Dube et al. |
| 11,625,398 | B1 * | 4/2023 | Bhuyan ............. G06F 16/24544 707/714 |
| 2004/0220923 | A1 | 11/2004 | Nica |
| 2005/0086226 | A1 | 4/2005 | Krachman |
| 2013/0212086 | A1 | 8/2013 | Burger et al. |
| 2015/0379076 | A1 | 12/2015 | Grosse et al. |
| 2017/0060947 | A1 | 3/2017 | Zhang et al. |
| 2017/0255648 | A1 | 9/2017 | Dube et al. |
| 2018/0218038 | A1 | 8/2018 | Katahira et al. |
| 2019/0073397 | A1 | 3/2019 | Veldhuizen |

FOREIGN PATENT DOCUMENTS

| | | |
|---|---|---|
| CN | 104392006 A | 3/2015 |
| CN | 105989027 A | 10/2016 |
| CN | 107169110 A | 9/2017 |
| CN | 107491508 A | 12/2017 |
| CN | 109241093 A | 1/2019 |
| CN | 109241104 A | 1/2019 |
| CN | 109313640 A | 2/2019 |

OTHER PUBLICATIONS

Marcus et al., "Neo: A Learned Query Optimizer," Proceedings of the VLDB Endowment, vol. 12, No. 11, pp. 1705-1718, XP093002894, DOI:10.14778/3342263.3342644, Retrieved from the Internet:URL:https://www.vldb.org/bvldb/vol2/p1705-marcus.pdf (Jul. 2019).

Kraska et al., "SageDB: A Learned Database System," Conference on Innovative Data Systems Research (CIDR), Total 10 pages (2019).

Ortiz et al., "Learning State Representations for Query Optimization with Deep Reinforcement Learning," Total 5 pages (Mar. 22, 2018).

Krishnan et al., "Learning to Optimize Join Queries With Deep Reinforcement Learning," Total 19 pages (Jan. 10, 2019).

Marcus et al., "Deep Reinforcement Learning for Join Order Enumeration," pp. 1-7 (Mar. 12, 2018).

* cited by examiner

| GMRL　　Test set　　Algorithm | JOB | TPC-H |
|---|---|---|
| RTOS | 0.67 | 0.92 |
| ReJoin | 1.14 | 0.96 |
| QP100 | NA | 1.03 |
| QP1000 | 1.9 | 1 |
| DQ | 1.23 | 0.99 |

DATABASE PROCESSING METHOD AND APPARATUS

CROSS-REFERENCE TO RELATED APPLICATIONS

This application is a continuation of International Application No. PCT/CN2021/070816, filed on Jan. 8, 2021, which claims priority to Chinese Patent Application No. 202010029386.4, filed on Jan. 10, 2020. The disclosures of the aforementioned applications are hereby incorporated by reference in their entireties.

TECHNICAL FIELD

This application relates to the database field, and in particular, to a database processing method and an apparatus.

BACKGROUND

A database management system can receive a query request sent by a database client, and execute the query request based on a plan corresponding to the query request. For example, the system views, accesses, and/or manipulates data stored in a database, and returns a query result of the query request to the database client. The query request is usually used to indicate information about a plurality of to-be-joined original tables in the database, and a plan generated by the database client is used to indicate a join order of the plurality of original tables. For a given query request, a plurality of original tables indicated by the query request may be joined in different join orders. In addition, a larger quantity of to-be-joined tables indicates a larger quantity of join orders (which are referred to as candidate join orders) corresponding to the query request, namely, a larger quantity of candidate plans corresponding to the query request. Although a plurality of tables indicated by the query request can be joined in each of different join orders, costs of executing the query request according to plans generated based on the different join orders are usually different. It is assumed that costs of executing the query request by the database management system according to a plan generated based on a target join order are the lowest. In order to improve response efficiency of the database management system to the query request, the database management system usually selects the target join order for the query request by using an optimizer.

The optimizer selects a target join order for the query request by providing a cost prediction module that can accurately predict costs of executing the query request according to a plan generated based on each candidate join order. For an optimizer that selects a target join order by using a reinforcement learning (RL) method, the cost prediction module needs to predict costs of an incomplete join order, that is, a plurality of candidate plans may be generated based on current join orders. The cost prediction module needs to predict the optimal costs of executing the query request according to the plurality of plans generated based on the candidate join orders.

To facilitate predicting costs of each candidate join order, the cost prediction module needs to perform feature extraction on the join order to obtain representation information of the join order, and perform cost prediction based on the representation information of the join order. The article entitled "learning to optimize join queries with deep reinforcement learning (Learning to optimize join queries with deep reinforcement learning)" provides a DQ algorithm that characterizes a join order based on information about whether a table is in the join order. The article entitled "deep reinforcement learning for join order enumeration" provides a ReJOIN algorithm that uses a depth in a join table to construct representation information of a join order. It can be learned that in a process of performing feature extraction on a join order in a conventional technology, only part of information in the join order can be learned, for example, only information of a table in the join order can be learned. As a result, a case in which different join orders have same representation information may occur.

According to the conventional technology, representation information generated for different join orders may be the same, which causes that costs predicted by the cost prediction module for different join orders may be the same. This does not help the cost prediction module to accurately predict costs for the join orders. Further, the optimizer cannot select a target join order for a query statement based on the costs predicted by the cost prediction module.

SUMMARY

According to a first aspect, an embodiment of this application provides a database processing method, including: obtaining a tree structure used to represent a join order of a plurality of original tables in a database, where the join order is determined based on a query request for operating data in the database, the operation includes a join operation for the plurality of original tables, the tree structure includes a first join tree, and the first join tree represents one or more join operations for joining at least two original tables in the plurality of original tables: inputting the tree structure into a neural network, where the neural network includes a first feature extraction layer and a cost prediction layer: allocating, by the first feature extraction layer, a first attribute matrix to each child node based on a location of each child node in the first join tree, and performing feature extraction on the first join tree based on the first attribute matrix allocated to each child node in the first join tree, to obtain representation information of the first join tree, where the first attribute matrix is obtained by the first feature extraction layer in a training process: and predicting, by the cost prediction layer based on representation information of the tree structure, costs of executing the query request according to a first plan, and outputting the predicted costs, where the first plan is generated based on the join order, and the representation information of the tree structure is determined based on the representation information of the first join tree.

According to the method provided in the first aspect, the tree structure is used to represent the join order and used as an input of the neural network, and different first attribute matrices are allocated to different brother nodes in the input tree structure by the first feature extraction layer in the neural network. This helps the first feature extraction layer comprehensively learn information about the join order, and output representation information capable of differentiating the join order from another join order, helps the cost prediction layer accurately predict costs of the join order, further helps an optimizer select a join order with lowest costs based on the costs predicted by a cost prediction module, and helps the cost prediction module provide accurate annotation information for a training sample of the optimizer.

The first feature extraction layer may include one or more neural network layers, and the cost prediction layer may also include one or more neural network layers.

Assuming that one parent node in the first join tree includes three child nodes: a node 1, a node 2, and a node 3 successively from left to right, the first feature extraction layer may determine a first attribute matrix of the node 1 based on a location of the node 1 in the first join tree, for example, a location relative to brother nodes (the node 2 and the node 3) of the node 1. Similarly, the first feature extraction layer may determine first attribute matrices of the node 2 and the node 3 based on locations of the node 2 and the node 3 in the first join tree respectively. For ease of distinguishing between different locations of the nodes, first attribute matrices of the node 1, the node 2, and the node 3 may be different.

In a process of training the neural network, the first feature extraction layer may learn to obtain the first attribute matrices allocated to the child nodes at different locations in the join tree. The first attribute matrix may also be referred to as a weight matrix or a variation matrix.

In a possible implementation, the first join tree includes a plurality of parent nodes, each parent node in the plurality of parent nodes corresponds to one join operation in the one or more join operations, and a first parent node in the plurality of parent nodes represents a join table obtained by using a first join operation. A first child node of the first parent node represents a table joined by using the first join operation, and if the first child node is a leaf node, the first child node represents an original table in the at least two original tables.

In a possible implementation, a first join condition in the query request indicates a condition that needs to be satisfied for a first column in an original table joined by using the first join operation, a second child node of the first parent node is used to represent the first column, and the second child node is a leaf node.

It is not limited that each join operation has a join condition, but it is limited that for any join operation that has a join condition, a child node of a parent node corresponding to the join operation is used to represent a column indicated in the join condition.

In a possible implementation, the performing, by the first feature extraction layer, feature extraction on the first join tree based on the first attribute matrix allocated to each child node in the first join tree, to obtain representation information of the first join tree includes: obtaining, by the first feature extraction layer, the representation information of the first join tree based on the first attribute matrix allocated to each child node in the first join tree and representation information of each leaf node in the first join tree, where the first attribute matrix allocated by the first feature extraction layer to the first child node is different from the first attribute matrix allocated to a brother node of the first child node.

The first feature extraction layer may be an N-ary Tree-LSTM network, or may be another algorithm or manner. A common feature is that a variation matrix W (which is referred to as the first attribute matrix) of a child node is determined based on a location of the child node relative to another brother node. For example, the first attribute matrix of the child node is different from a first attribute matrix of any brother node. Different parent nodes correspond to different join operations in the query request, and the different join operations may be distinguished by using tables joined to the join operations.

The representation information of each leaf node may be obtained by one or more neural network layers, which may be disposed in the neural network and perform training with the first feature extraction layer and the cost prediction layer by using a same sample. Alternatively, the neural network layers may not be disposed in the neural network, and perform training separately from the first feature extraction layer and the cost prediction layer, for example, not use the same sample.

In a possible implementation, the obtaining, by the first feature extraction layer, the representation information of the first join tree based on the first attribute matrix allocated to each child node in the first join tree and representation information of each leaf node in the first join tree includes: obtaining, by the first feature extraction layer in a descending order of heights (or depths) of the parent nodes in the first join tree, representation information of each parent node based on representation information of each child node of each parent node in the first join tree and the first attribute matrix allocated to each child node: and representation information of a root node in the first join tree is the representation information of the first join tree. In other words, representation information of a current parent node is obtained in the descending order of the heights (or the depths) of the parent nodes in the first join tree, and based on representation information of each child node of the current parent node in the first join tree and the first attribute matrix allocated to each child node, until the representation information of the root node is obtained. The representation information of the root node in the first join tree is the representation information of the first join tree.

In a possible implementation, the at least two original tables include a first table, and representation information of the first table is generated based on representation information of each column in the first table.

Representation information of the table is generated based on the representation information of the column, so that when a column is added, the representation information of the table is easily reconstructed. For example, representation information of a first table is obtained by inputting the representation information of each column in the first table into a dynamic pooling layer. The dynamic pooling layer does not limit an input length, so that when a column is added, the representation information of the table can still be obtained.

The dynamic pooling layer may be disposed in the neural network and perform training with the first feature extraction layer and the cost prediction layer by using a same sample. Alternatively, the dynamic pooling layer may not be disposed in the neural network, and perform training separately from the first feature extraction layer and the cost prediction layer, for example, not use the same sample.

In a possible implementation, the tree structure further includes a second join tree: a root node of the second join tree is used to represent an original table other than the at least two original tables in the plurality of original tables, or is used to represent a join table obtained by joining original tables other than the at least two original tables in the plurality of original tables: and the second join tree is not joined to the first join tree. The neural network further includes a second feature extraction layer. The method further includes: after the first feature extraction layer obtains the representation information of the first join tree, allocating, by the second feature extraction layer, a same second attribute matrix to each of representation information of the second join tree and the representation information of the first join tree: and performing feature extraction on the representation information of the second join tree and the representation information of the first join tree, to obtain the representation information of the tree structure, where the second attribute matrix is obtained by the second feature extraction layer in a training process.

In a possible implementation, the predicting, by the cost prediction layer based on representation information of the tree structure, costs of executing the query request according to a first plan includes: predicting, by the cost prediction layer based on the representation information of the tree structure and representation information of the query request, the costs of executing the query request according to the first plan.

If the tree structure includes only the first join tree, the costs of executing the query request according to the first plan may be predicted based on the representation information of the first join tree and the representation information of the query request.

If the tree structure includes the first join tree and the second join tree, after the representation information of the tree structure is obtained based on the representation information of the first join tree and the representation information of the second join tree, the costs of executing the query request according to the first plan are predicted based on the representation information of the tree structure and the representation information of the query request.

In a possible implementation, the representation information of the query request is determined based on representation information of a join condition in the query request. When a join condition is added, it is convenient to flexibly determine the representation information of the query request.

In a possible implementation, a second join condition is any one of join conditions of the one or more join operations, and representation information of the second join condition is determined based on representation information of a column indicated by the second join condition.

This facilitates flexible construction of representation information of the join condition. For example, the representation information of the join condition may be generated by a fully connected layer.

The fully connected layer may be disposed in the neural network and perform training with the first feature extraction layer and the cost prediction layer by using a same sample. Alternatively, the fully connected layer may not be disposed in the neural network, and perform training separately from the first feature extraction layer and the cost prediction layer, for example, not use the same sample.

In a possible implementation, a second column is any column in any original table in the at least two original tables, and representation information of the second column is obtained based on a feature vector of the second column: and the feature vector of the second column is used to indicate whether the second column is a column indicated by the join condition in the query request.

The representation information of the second column may be obtained by inputting the feature vector of the second column into the fully connected layer. The fully connected layer may be disposed in the neural network and perform training with the first feature extraction layer and the cost prediction layer by using a same sample. Alternatively, the fully connected layer may not be disposed in the neural network, and perform training separately from the first feature extraction layer and the cost prediction layer, for example, not use the same sample.

In a possible implementation, a feature vector of the first column is used to indicate whether the first column is a column indicated by the join condition in the query request.

In a possible implementation, the query request is further used to indicate to perform a select operation on one or more original tables in the plurality of original tables based on a selection condition, and the feature vector of the second column is further used to represent the selection condition that needs to be satisfied for the first column.

In a possible implementation, the cost prediction layer includes a first cost prediction layer and a second cost prediction layer. The predicting, by the cost prediction layer based on representation information of the tree structure, costs of executing the query request according to a first plan, and outputting the predicted costs includes: obtaining and outputting, by the first cost prediction layer, first costs based on the representation information of the tree structure, where annotation information of a training sample used by the first cost prediction layer is costs obtained by a cost prediction model: and obtaining and outputting, by the second cost prediction layer, second costs based on the representation information of the tree structure, where annotation information of a training sample used by the second cost prediction layer is costs obtained by executing a plan corresponding to the training sample. After the cost prediction layer outputs the first costs and the second costs, the method further includes: determining, based on the first costs and the second costs, third costs of executing the query request according to the first plan.

According to a second aspect, an embodiment of this application provides a database processing method, including: obtaining a query request, where the query request is used to operate data in a database, and the operation includes performing a join operation on a plurality of original tables in the database: determining a plurality of candidate join orders of the plurality of original tables: selecting a target join order with lowest costs from the plurality of candidate join orders, where a first join order is any one of the plurality of candidate join orders, costs of the first join order are costs of executing the query request according to a first plan, the costs of the first join order are determined based on costs that are obtained and output by a cost prediction layer in a neural network based on representation information of a first tree structure after the first tree structure used to represent the first join order is input into the neural network, the first plan is generated based on the join order, the first tree structure includes a first join tree, the first join tree is used to represent one or more join operations for joining at least two original tables in the plurality of original tables, the representation information of the first tree structure is determined based on representation information of the first join tree, the representation information of the first join tree is obtained by a first feature extraction layer in the neural network by allocating a first attribute matrix to each child node based on a location of each child node in the first join tree and performing feature extraction on the first join tree based on the first attribute matrix allocated to each child node in the first join tree, and the first attribute matrix is obtained by learning by the first neural network in a training process: and generating a target plan based on the target join order, and executing the target plan to obtain a query result of the query request.

In a possible implementation, the first join tree includes a plurality of parent nodes, each parent node in the plurality of parent nodes corresponds to one join operation in the one or more join operations, and a first parent node in the plurality of parent nodes represents a join table obtained by using a first join operation. A first child node of the first parent node represents a table joined by using the first join operation, and if the first child node is a leaf node, the first child node represents an original table in the at least two original tables.

In a possible implementation, a first join condition in the query request indicates a condition that needs to be satisfied for a first column in an original table joined by using the first join operation, a second child node of the first parent node is used to represent the first column, and the second child node is a leaf node.

In a possible implementation, the representation information of the first join tree is obtained by the first feature extraction layer based on the first attribute matrix allocated to each child node in the first join tree and representation information of each leaf node in the first join tree, and the first attribute matrix allocated by the first feature extraction layer to the first child node is different from the first attribute matrix allocated to a brother node of the first child node.

In a possible implementation, the representation information of the first join tree is representation information of a root node in the first join tree: and the representation information of the root node in the first join tree is obtained by the first feature extraction layer in a descending order of heights of the parent nodes in the first join tree, based on representation information of each child node of each parent node in the first join tree and the first attribute matrix allocated to each child node.

In a possible implementation, the at least two original tables include a first table, and representation information of the first table is generated based on representation information of each column in the first table.

In a possible implementation, the first tree structure further includes a second join tree: a root node of the second join tree is used to represent an original table other than the at least two original tables in the plurality of original tables, or is used to represent a join table obtained by joining original tables other than the at least two original tables in the plurality of original tables: and the second join tree is not joined to the first join tree. The representation information of the first tree structure is obtained by the second feature extraction layer in the neural network by allocating a same second attribute matrix to each of representation information of the second join tree and the representation information of the first join tree and performing feature extraction on the representation information of the second join tree and the representation information of the first join tree, after the representation information of the first join tree is obtained by the first feature extraction layer, where the second attribute matrix is obtained by the second feature extraction layer in a training process.

In a possible implementation, the costs of the first join order are determined based on costs output and predicted by the cost prediction layer based on the representation information of the first tree structure and representation information of the query request.

In a possible implementation, the representation information of the query request is determined based on representation information of a join condition in the query request.

In a possible implementation, a second join condition is any one of join conditions of the one or more join operations, and representation information of the second join condition is determined based on representation information of a column indicated by the second join condition.

In a possible implementation, the costs output by the cost prediction layer include first costs and second costs: the first costs are obtained and output by a first cost prediction layer in the cost prediction layer based on the representation information of the first tree structure, and annotation information of a training sample of the first cost prediction layer is costs obtained by a cost prediction model: and the second costs are obtained and output by a second cost prediction layer in the cost prediction layer based on the representation information of the first tree structure, and annotation information of a training sample of the second cost prediction layer is costs obtained by executing a plan corresponding to the training sample.

According to a third aspect, an embodiment of this application provides a database providing system, including one or more functional units configured to perform the method described in any one of the first aspect, the implementations of the first aspect, the second aspect, or the implementations of the second aspect. The functional units may be implemented by a software module, or hardware, for example, a processor, or by software in combination with necessary hardware.

According to a fourth aspect, an embodiment of this application provides a device, including a memory, a processor, and a computer program stored in the memory. When executing the computer program, the processor implements steps of the method described in any one of the first aspect, the implementations of the first aspect, the second aspect, or the implementations of the second aspect.

According to a fifth aspect, an embodiment of this application provides a computer-readable storage medium, where the computer-readable storage medium stores a computer program (or instructions). When the program (or the instructions) is executed by a processor, steps of the method described in any one of the first aspect, the implementations of the first aspect, the second aspect, or the implementations of the second aspect are implemented.

DESCRIPTION OF EMBODIMENTS

A database is a set of data organized, described, and stored according to a mathematical model. The database may include one or more database structures or formats, such as row storage and column storage. The database is usually stored in data storage, for example, an external data storage, or a non-transitory computer-readable medium. When the database is stored on the non-transitory computer-readable medium, a database management system is a memory database management system.

Figure 1:
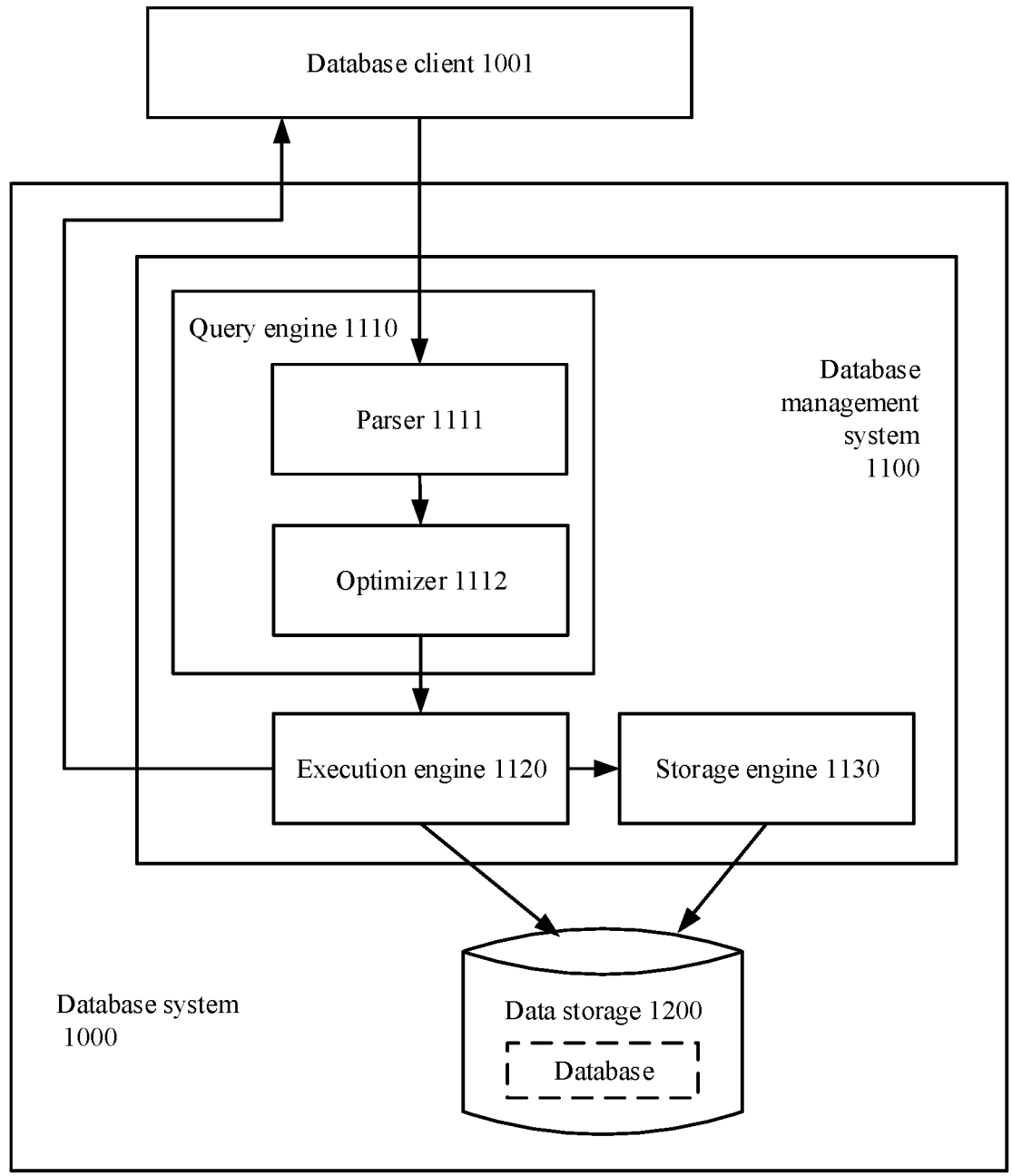
FIG. 1 is a schematic diagram of interaction between a database system and a database client.

FIG. 1 is a schematic diagram of interaction between a database system 1000 and a database client 1001. The database system 1000 may include a database management system (DBMS) 1100 and a data storage 1200. The database management system 1100 is configured to: receive a query request (or referred to as a query statement) sent by the database client 1001: based on the query request, access related data of the query request in a database in the data storage 1200 and manipulate the related data, to generate a query result corresponding to the query request: and returning the query result to the database client 1001.

The database client 1001 may include any type of device or application configured to interact with the database management system 1100. In some examples, the database client 1001 may include one or more application servers.

The query request is used to view, access, and/or manipulate data stored in the database. A common query request is a query request in a structured query language (SQL) format (or referred to as an SQL query statement). The SQL is a special programming language used specifically to manage data stored in a relational database. The SQL may refer to various types of data-related languages, including a data definition language, a data manipulation language, and the like. An SQL query may be used to request at least one of the following operations performed on the data in the database: data insertion, query, update and deletion, schema creation and modification, data access control, and the like. Further, in some examples, the SQL may include descriptions associated with various language elements, including a clause, an expression, a predicate, a query, and a statement. For example, the clause may be various constituents of the statement and the query. In addition, in some cases, it is considered that the clause is optional. In addition, the expression may be configured to generate a scalar value and/or a table including a data column and/or row. In addition, the predicate may be configured with a specified condition, to adjust an effect of the statement and the query.

The database management system 1100 usually includes a query engine 1110, an execution engine 1120, and a storage engine 1130. The database management system 1100 may be a relational database management system (RDBMS). The database management system 1100 supports the SQL, and may receive a query request in the SQL format (or referred to as an SQL query or the SQL query statement). The query engine 1110 is configured to generate a corresponding execution plan (or referred to as a plan for short) based on the query request or the query statement sent by the database client 1001. The execution engine 1120 is configured to perform an operation on the data in the database according to the execution plan generated by the query engine 1110, to generate a query result. The storage engine 1130 is configured to: on a file system, manage data of the table and actual content of an index, and also manage data such as Cache, Buffer, Transaction, and Log during running. For example, the storage engine 1130 may write an execution result of the execution engine 1120 to the data storage 1200 through a physical I/O interface.

A table is an object used to store data in the database, and is a collection of structured data and thus a basis of the entire database system. A table is a database object that includes all the data in the database, and may be defined as a collection of columns.

It may usually be considered that the query engine 1110 includes a parser 1111 and an optimizer 1112. The parser 1111 is configured to perform syntax and semantic analysis on the SQL query statement. The optimizer 1112 is configured to generate an optimal execution plan (which has lowest execution costs) for the SQL query statement. For example, when there are joins (join) of a plurality of tables in the query statement, the optimizer 1112 may determine a join order of each table. For a given query request, a plurality of original tables indicated by the query request may be joined by using different join orders, and a larger quantity of tables to be joined indicates a larger quantity of join orders (which are referred to as candidate join orders) corresponding to the query request, namely, a larger quantity of candidate plans corresponding to the query request. Logical results corresponding to different join orders are the same, but execution costs are usually different. A function of the optimizer 1112 is to select a join order with lowest costs, and generate an execution plan for the query statement based on the join order, for execution by the execution engine 1120.

Figure 2:
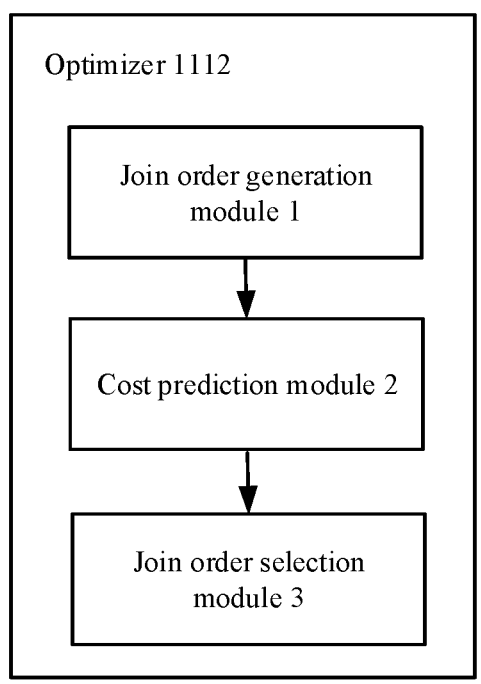
FIG. 2 is a schematic diagram of an optimizer obtained by using a reinforcement learning method.

The optimizer 1112 selects the join order with lowest costs for the query request via a cost prediction module disposed in the optimizer 1112. The cost prediction module can accurately predict costs of executing the query request according to a plan generated based on each candidate join order. FIG. 2 is a schematic diagram of a structure of the optimizer 1112 obtained by using a reinforcement learning (reinforcement learning. RL) method. The optimizer 1112 may include a join order generation module 1, a cost prediction module 2, and a join order selection module 3. After the optimizer 1112 receives the SQL query statement parsed by the parser 1111, the join order generation module 1 may generate a plurality of intermediate join orders (or referred to as candidate join orders) for the parsed SQL query statement. The intermediate join order is a join order for joining only some to-be-joined tables in the SQL, that is, the intermediate join order is an incomplete join order. The cost prediction module 2 may predict costs of each intermediate state obtained by the join order generation module 1. The join order selection module 3 may select an intermediate join order with lowest costs from the costs predicted by the cost prediction module 2. Then, the join order generation module 1 may generate a plurality of join orders based on the intermediate join order selected by the join order selection module. Then, the cost prediction module 2 and the join order selection module 3 continue to select a join order with lowest costs. If the join order is still an intermediate join order, namely, an order for joining some unjoined tables in the selected intermediate join order, the foregoing operation may be repeatedly performed. If the join order is a complete join order, namely, an order for joining all to-be-joined tables in the SQL, the optimizer 1112 may generate an execution plan for the SQL query request based on the join order, and send the execution plan to the execution engine 1120 for execution.

Reinforcement learning is to learn an optimal policy, which allows an agent to take an action based on a current state in a specific environment, to obtain a maximum reward. Reinforcement learning can be modeled simply by a four-tuple <A. S. R. P>. A represents action, which is an action sent by the agent. State is a state of the world perceived by the agent. Reward is a real-number value representing a reward or punishment. P is the world that the agent interacts with. For the optimizer 1112 obtained through reinforcement learning shown in FIG. 2, the join order (the intermediate join order or the complete join order) generated by the join order generation module may be considered as A, the unjoined table and/or the SQL query request may be considered as S. R is determined based on the costs returned by the execution engine 1120, and the execution engine 1120 is considered as P.

Accuracy of the optimizer 1112 obtained through reinforcement learning is primarily determined by the costs returned by the execution engine 1120. Costs of obtaining, by the execution engine 1120, costs (for example, a latency) by executing the execution plan provided by the execution optimizer 1112 are quite high, and it is difficult to provide enough samples for reinforcement learning. Therefore, the costs of the join order are usually predicted by the trained cost prediction module. For example, the cost prediction module may be disposed in the execution engine 1120. As can be seen, another key to selection of the join order with lowest costs for the query request by the optimizer 1112 is to provide a cost prediction module capable of providing an accurate reward for a reinforcement learning process of the optimizer 1112. For example, the cost prediction module may be disposed in the execution engine 1120.

The join order has a large amount of information. To facilitate prediction of the costs of the join order, the cost prediction module needs to perform feature extraction on the join order to obtain representation information of the join order, and predict the costs based on the representation information of the join order. In a process of performing feature extraction on a join order in a conventional technology, only part of information in the join order can be learned, for example, only information of a table in the join order can be learned. As a result, a case in which different join orders have same representation information may occur.

According to the conventional technology, representation information generated for different join orders may be the same, which causes that costs predicted by the cost prediction module for different join orders may be the same. This does not help the cost prediction module to accurately predict costs for the join orders. Further, the optimizer 1112 cannot select a join order with lowest costs for the query statement based on the costs predicted by the cost prediction module.

This application provides a database processing method, to generate different representation information for different join orders, to improve accuracy of costs predicted by a cost prediction module, and further improve a possibility that the optimizer 1112 selects a join order with lowest costs for a query request.

Figure 3:
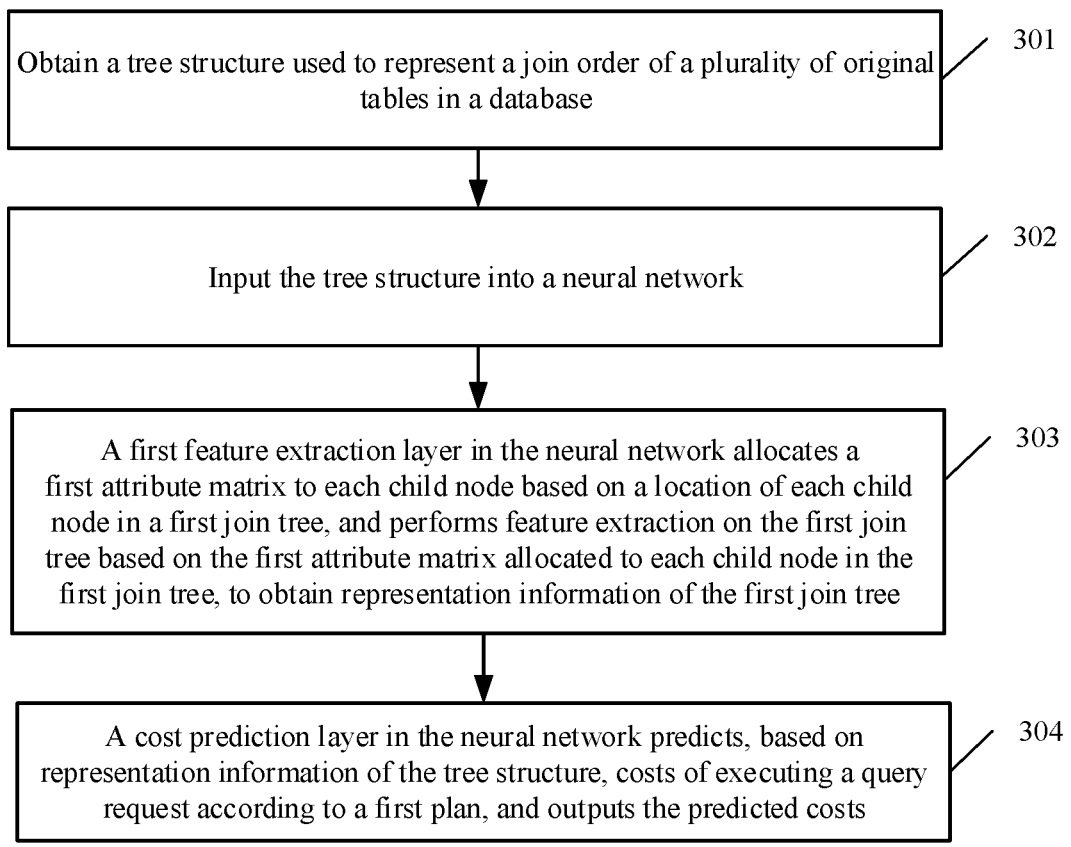
FIG. 3 is a schematic diagram of an embodiment of a database processing method according to this application.

FIG. 3 is a schematic diagram of an embodiment of a database processing method according to this application. With reference to FIG. 3, the embodiment of the database processing method according to this application may include the following steps:

301: Obtain a tree structure used to represent a join order of a plurality of original tables in a database.

The join order may be input into a cost prediction module (for example, a cost prediction module of an optimizer, or a cost prediction module that provides costs for reinforcement learning of the optimizer) in various forms of representation. In this embodiment of this application, the tree structure may be used to represent a join order, and the cost prediction module may obtain the tree structure used to represent a join order of a plurality of original tables in the database. The join order may be determined based on a query request used to operate data in the database, where the operation includes performing a join operation on the plurality of original tables.

When the join order represented by the tree structure is a complete join order (that is, all to-be-joined original tables in the query request are joined), the tree structure may be a tree structure used to represent the join order of a table (referred to as a join tree). When the join order represented by the tree structure is an intermediate join order (namely, all the to-be-joined tables in the query request that are unjoined), the tree structure may include two or more unjoined (or mutually exclusive) join trees. When the tree structure includes two or more unjoined join trees, the tree structure may alternatively be referred to as a forest structure.

In this embodiment of this application, the tree structure includes at least a first join tree. The first join tree represents a join order of at least two original tables in the plurality of original tables, or represents one or more join operations used to join at least two original tables in the plurality of original tables. Each join operation is used to represent information (for example, identifiers of two tables and locations of the two tables) about the two tables joined. If the first join tree represents a join order of two original tables, the first join tree represents a join operation: if the first join tree represents a join order of three original tables (a table 1, a table 2, and a table 3), the first join tree represents two join operations (a join operation 1 and a join operation 2). The join operation 1 is used to connect two original tables (the table 1 and the table 2), and the join operation 2 is used to join the table 3 and a join table obtained by using the join operation 1. It can be easily seen that the first join operation is performed before the join operation 2.

302: Input the tree structure into a neural network.

After the tree structure is obtained, the tree structure may be input into the neural network. The neural network may include a first feature extraction layer and a cost prediction layer.

303: The first feature extraction layer in the neural network allocates a first attribute matrix to each child node based on a location of each child node in the first join tree, and performs feature extraction on the first join tree based on the first attribute matrix allocated to each child node in the first join tree, to obtain representation information of the first join tree.

After the tree structure is input into the neural network, the first join tree in the tree structure may be input into the first feature extraction layer to obtain the representation information of the first join tree. The first feature extraction layer allocates the first attribute matrix to each child node based on the location of each child node in the first join tree, and performs feature extraction on the first join tree based on the first attribute matrix allocated to each child node in the first join tree. The first attribute matrix is obtained by the first feature extraction layer in a training process.

The first feature extraction layer is a graph neural network (graph neural network, GNNs) that can extract features from the tree structure or is a unit in the graph neural network. For example, the first feature extraction layer may be an LSTM unit in an N-ary tree-structured long short-term memory network (tree-structured long short-term memory network, Tree-LSTM network) or a Tree-LSTM network.

304: The cost prediction layer in the neural network predicts, based on representation information of the tree structure, costs of executing the query request according to a first plan, and outputs the predicted costs.

After the representation information of the first join tree is obtained, the cost prediction layer may predict, based on the representation information of the tree structure, the costs of executing the query request according to the first plan, and output the predicted costs. The first plan is a plan that is generated based on the join order and that can be executed by an execution engine.

When only a case that the join order has an impact on costs of a plan is considered, if the tree structure is used to represent a complete join order, the first plan is a unique plan corresponding to the tree structure: if the tree structure is used to represent an intermediate join order, and there are a plurality of complete join orders (assuming that there are n) generated based on the intermediate join order, the tree structure corresponds to n plans, and the first plan is a plan with minimum costs in the n plans.

According to this embodiment of this application, the tree structure is used to represent the join order and used as an input of the neural network, and different first attribute matrices are allocated to different brother nodes in the input tree structure by the first feature extraction layer in the neural network. This helps the first feature extraction layer comprehensively learn information about the join order, and output representation information capable of differentiating the join order from another join order, helps the cost prediction layer accurately predict costs of the join order, further helps the optimizer select a join order with lowest costs based on the cost predicted by the cost prediction module, and helps the cost prediction module provide accurate annotation information for a training sample of the optimizer.

In a possible implementation, the first join tree may include a plurality of parent nodes, each parent node in the plurality of parent nodes corresponds to one join operation in the one or more join operations represented by the first join tree, and a first parent node in the plurality of parent nodes represents a join table obtained by using a first join operation. A first child node of the first parent node represents a table joined by using the first join operation, and if the first child node is a leaf node, the first child node represents an original table in the at least two original tables.

Figure 4A:
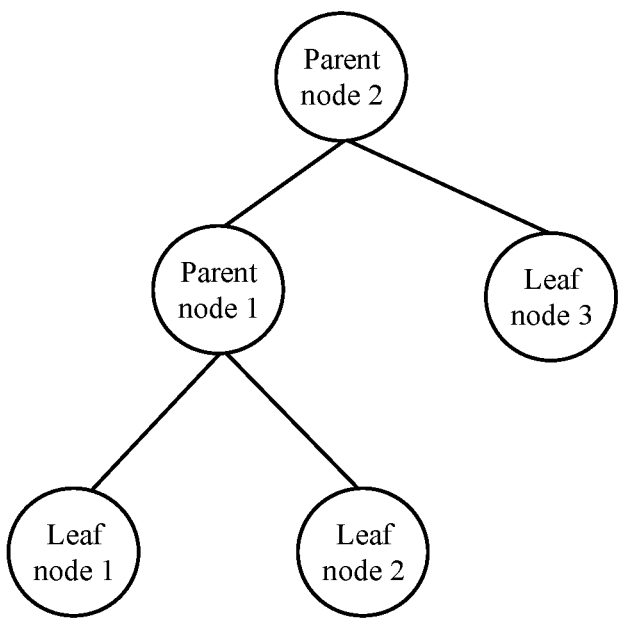
FIG. 4A is a schematic diagram of a first join tree.

An example in which a plurality of to-be-joined original tables in the query request include the table 1, the table 2, and the table 3 is used. FIG. 4A is a schematic diagram of the first join tree. In FIG. 4A, a parent node 1 is used to represent a join table 1 obtained by joining the table 1 and the table 2. The parent node 1 includes two first child nodes: a leaf node 1 and a leaf node 2 in FIG. 4A, and the leaf node 1 and the leaf node 2 are respectively used to represent the table 1 and the table 2. A parent node 2 is used to represent a join table 2 obtained by joining the table 1 and the table 3. The parent node 2 includes two first child nodes: a leaf node 3 and the parent node 1 in FIG. 4A, and the leaf node 3 is used to represent the table 3.

The query request usually includes a join condition, which is used to indicate a join relationship between at least two original tables. In a possible implementation, a first join condition in the query request may indicate a condition that needs to be satisfied for a first column in an original table joined by using the first join operation. A second child node of the first parent node is used to represent the first column, and the second child node is a leaf node.

It is assumed that a query request is:
"select *
From the table 1, the table 2, and the table 3
Where table 1.*a*=table 3.*a*"

Figure 4B:
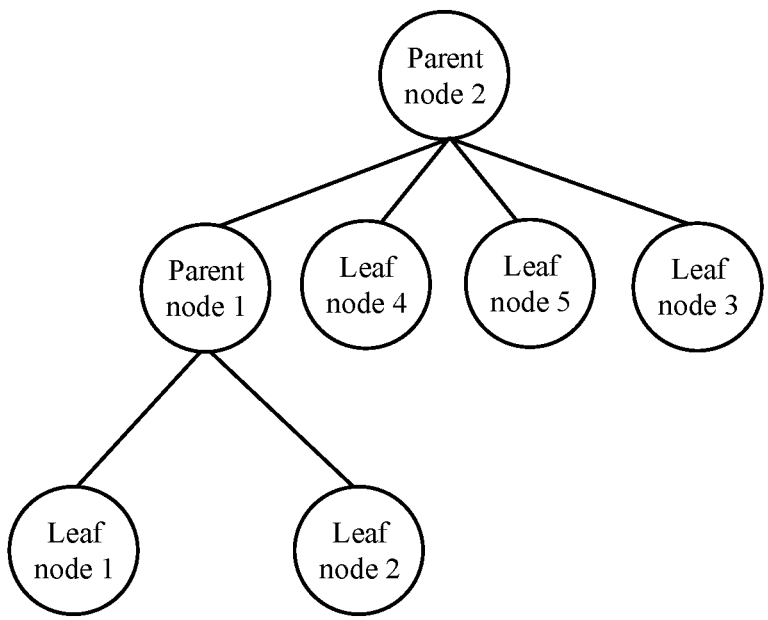
FIG. 4B is another schematic diagram of a first join tree.

Then, a join condition in the query request may be "table 1.*a*=table 3.*a*". It is assumed that the join order between the table 1, the table 2, and the table 3 is shown in FIG. 4A. A join operation corresponding to the parent node 2 is used to join the table 3 represented by the leaf node 3 and a join table obtained by joining the table 1 and the table 2 represented by the parent node 1, and it may be considered that the join operation corresponding to the parent node 2 joins the two original tables: the table 1 and the table 3. Therefore, it may be considered that the join condition indicates conditions that need to be satisfied for column a in the table 1 and column a in the table 3 joined by using the join operation corresponding to the parent node 2. With reference to FIG. 4B, the parent node 2 may further include two second child nodes: a leaf node 4 and a leaf node 5 in FIG. 4B. The leaf node 4 and the leaf node 5 are respectively used to represent column a in the table 1 and column a in the table 3. For meanings represented by nodes in FIG. 4B that are the same as those in FIG. 4A, refer to FIG. 4A for understanding. Details are not described herein again.

In a possible implementation, that the first feature extraction layer performs feature extraction on the first join tree based on the first attribute matrix allocated to each child node in the first join tree, to obtain representation information of the first join tree may be specifically: obtaining, by the first feature extraction layer, the representation information of the first join tree based on the first attribute matrix allocated to each child node in the first join tree and representation information of each leaf node in the first join tree. The first attribute matrix allocated by the first feature extraction layer to the first child node is different from the first attribute matrix allocated to a brother node of the first child node.

In a possible implementation, the obtaining, by the first feature extraction layer, the representation information of the first join tree based on the first attribute matrix allocated to each child node in the first join tree and representation information of each leaf node in the first join tree may be specifically: obtaining, by the first feature extraction layer in a descending order of heights of the parent nodes in the first join tree, representation information of each parent node based on representation information of each child node of each parent node in the first join tree and the first attribute matrix allocated to each child node. Representation information of a root node in the first join tree is the representation information of the first join tree.

A height of a node refers to a longest path from a node to a leaf node. Using FIG. 4A as an example, a height of the leaf node 1 is 0, a height of the parent node 1 is 1, and a height of the parent node 2 is 2.

FIG. 4A is used as an example. Representation information of the parent node 1 is first calculated based on representation information of the leaf node 1, representation information of the leaf node 2, the first attribute matrix allocated to the leaf node 1, and the first attribute matrix allocated to the leaf node 2. Then, representation information of the parent node 2, namely, the representation information of the join tree shown in FIG. 4A, is calculated based on the representation information of the parent node 1, representation information of the leaf node 3, the first attribute matrix allocated to the parent node 1, and the first attribute matrix allocated to the leaf node 3.

In a possible implementation, the least two original tables include a first table, representation information of the first table is generated based on representation information of each column in the first table.

Representation information of the table is generated based on the representation information of the column. In this way, when a column is added, the representation information of the table is easily reconstructed.

In a possible implementation, the join order represented by the tree structure may be an intermediate join order. In this case, the tree structure is a tree structure and includes two or more join trees that are not joined (or mutually exclusive). It is assumed that the tree structure further includes a second join tree. A root node of the second join tree is used to represent an original table other than the at least two original tables in the plurality of original tables, or used to represent a join table obtained by joining original tables other than the at least two original tables in the plurality of original tables.

Figure 4C:
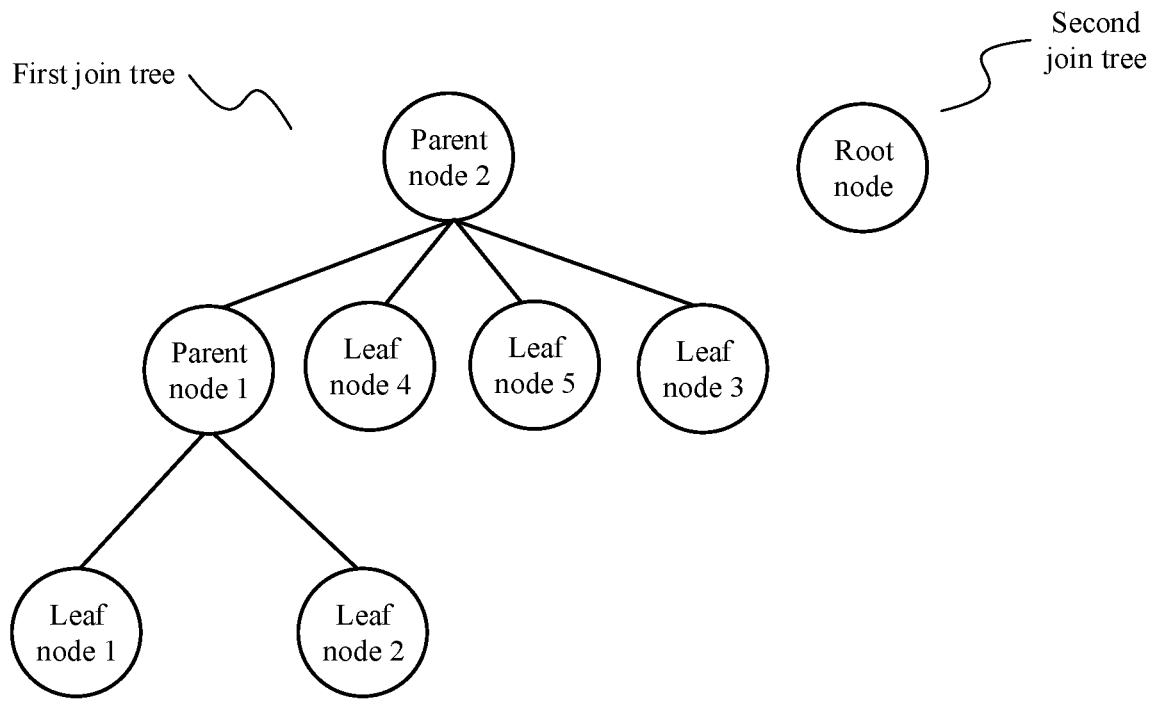
FIG. 4C is a schematic diagram of a tree structure.

An example in which the plurality of to-be-joined original tables in the query request are the table 1, the table 2, the table 3, and a table 4 is used. It is assumed that the first join tree in the tree structure is shown in FIG. 4B. FIG. 4C is a schematic diagram of a tree structure, in which the second join tree includes only one root node and does not include any leaf node, and the root node is used to represent the table 4.

Figure 4D:
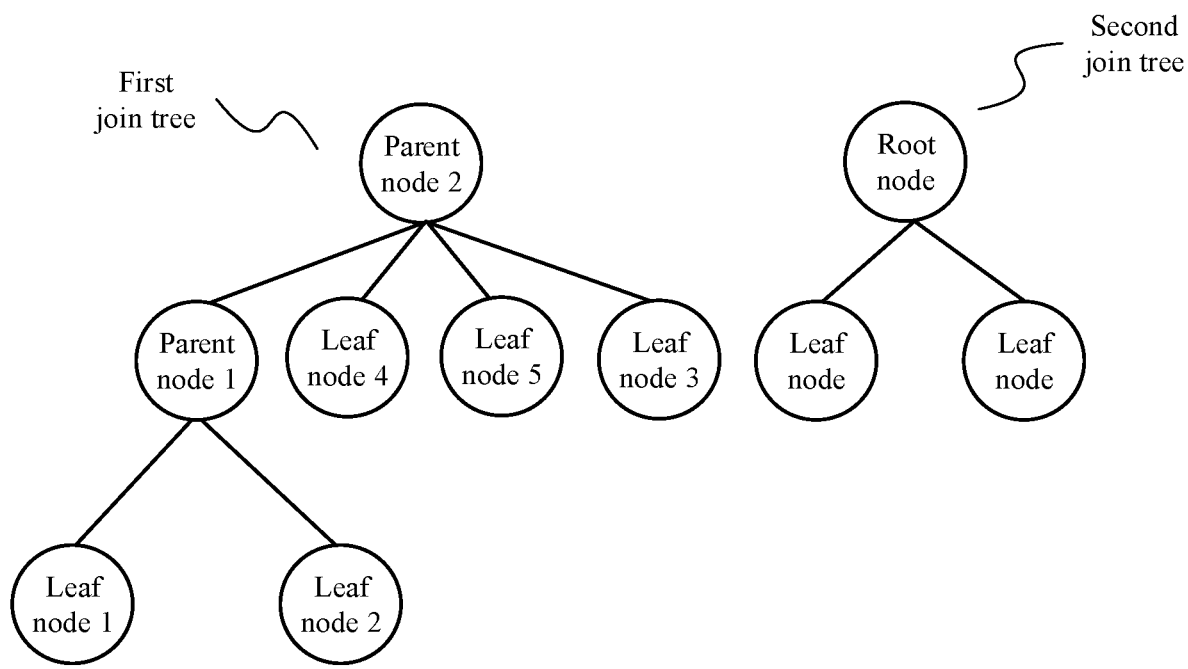
FIG. 4D is another schematic diagram of a tree structure.

An example in which the plurality of to-be-joined original tables in the query request are the table 1, the table 2, the table 3, the table 4, and a table 5 is used. It is assumed that the first join tree in the tree structure is shown in FIG. 4B. FIG. 4D is a schematic diagram of a tree structure, in which two leaf nodes of the second join tree are respectively used to represent the table 4 and the table 5, and a root node of the second join tree is used to represent a join table of the table 4 and the table 5.

In a possible implementation, the neural network further includes a second feature extraction layer. After the first feature extraction layer obtains the representation information of the first join tree, the method embodiment of this application further includes the following step:

allocating, by the second feature extraction layer, a same second attribute matrix to each of representation information of the second join tree and the representation information of the first join tree: and performing feature extraction on the representation information of the second join tree and the representation information of the first join tree, to obtain the representation information of the tree structure, where the second attribute matrix is obtained by the second feature extraction layer in a training process.

The second feature extraction layer may be one or more convolutional layers or pooling layers, or may be a graph neural network (GNNs) that can extract features from the tree structure or a unit in the graph neural network. For example, the second feature extraction layer may be an LSTM unit in a Childsum tree-structured long short-term memory network (Tree-LSTM network) or a Tree-LSTM network.

A main function of the pooling layer is to perform dimension reduction on a vector to improve information density of the feature. The pooling layer may include an average pooling operator and/or a maximum pooling operator. The average pooling operator may calculate values of a plurality of vectors at a same location, to generate an average value. The maximum pooling operator may obtain a maximum value in values of a plurality of vectors at a same location.

In the optimizer that learns by using an RL method, if costs are predicted based on more observed information, accuracy of the prediction result can be improved. Therefore, in a possible implementation, the predicting, based on the representation information of the tree structure, the costs of executing the query request according to the first plan may be specifically: predicting, based on the representation information of the tree structure and the representation information of the query request, the costs of executing the query request according to the first plan.

In a possible implementation, the representation information of the query request is determined based on representation information of a join condition in the query request. When a join condition of another query request is added, it is convenient to flexibly determine representation information of the query request.

It is assumed that a second join condition is any one of join conditions of the plurality of join operations. In a possible implementation, representation information of the second join condition is determined based on representation information of a column indicated by the second join condition. In this way, the representation information of the join condition can be flexibly constructed.

In a possible implementation, a second column is any column in any original table in the at least two original tables, and representation information of the second column is obtained based on a feature vector of the second column, for example, obtained by inputting the feature vector of the second column into a first fully connected layer. A parameter of the first fully connected layer is obtained by learning information of the first column.

The fully connected layer is usually used to integrate a plurality of types of information. For example, here, each column is globally corresponding to a fully connected layer. "Information about the column" is fixed into an attribute matrix through iterative training, and the attribute matrix in the fully connected layer can learn the information about the column. After a feature vector of the first column is input into the first fully connected layer, representation information of the first column output by the first fully connected layer can reflect both the feature vector of the first column determined based on the query request and the information about the column obtained by learning.

In a possible implementation, the feature vector of the second column is used to indicate whether the second column is a column indicated by the join condition in the query request.

In a possible implementation, the query request is further used to indicate to perform a select operation on one or more original tables in the plurality of original tables based on a selection condition, and the feature vector of the second column is further used to represent the selection condition that needs to be satisfied for the second column. The select operation may be a comparison operation, and the selection condition may be a condition of the comparison operation, for example, a column h>30 in table a.

Because of high costs of executing a plan to return costs by the execution engine, it is not conducive to providing more learning samples for the optimizer. The cost prediction module other than the optimizer predicts costs at lower costs but with lower accuracy. Therefore, in a possible implementation, two neural network layers (for example, the fully connected layers), namely, a first cost prediction layer and a second cost prediction layer may be disposed in the cost prediction layer. Annotation information of a training sample used by the first cost prediction layer is costs obtained by a cost prediction model. Annotation information of a training sample used by the second cost prediction layer is costs obtained by executing a plan corresponding to the training sample. Through multi-task learning, costs output by the two neural network layers (or referred to as output layers) are considered as two independent tasks sharing same representation information, and then a loss function can be set as a weighted sum of the two costs. Then, it is possible to learn both a sample using costs returned by the execution engine by executing the plan as annotation information (or referred to as reward) and a sample using costs predicted by the cost prediction module as annotation information (or referred to as reward).

In a possible implementation, that the cost prediction layer predicts, based on the representation information of the tree structure, the costs of executing the query request according to the first plan, and outputs the predicted costs may specifically include the following steps:

obtaining and outputting, by the first cost prediction layer, first costs based on the representation information of the tree structure, where the annotation information of the training sample used by the first cost prediction layer is the costs obtained by the cost prediction model; and obtaining and outputting, by the second cost prediction layer, second costs based on the representation information of the tree structure, where the annotation information of the training sample used by the second cost prediction layer is the costs obtained by executing the plan corresponding to the training sample.

The following step may further be performed after step 304:

determining, based on the first costs and the second costs, third costs of executing the query request according to the first plan.

The third costs may be used as costs predicted by the cost prediction model for a join order corresponding to the input tree structure. If the join order is used as a training sample of another neural network, the third costs may be used as annotation information of the join order. If the join order is generated by a join order generation module in the optimizer, a join order selection module may select an optimal join order based on the third costs. If the join order is a training sample with annotation information, and the foregoing method is used for a training process of the neural network, a loss function of the neural network may be calculated based on the third costs and the annotation information of the join order, and a parameter in the neural network is adjusted.

In a possible implementation, weights may be allocated to the first costs and the second costs, and the determining, based on the first costs and the second costs, third costs of executing the query request according to the first plan may be specifically: performing weighted summation on the first costs and the second costs based on the weight allocated to the first costs and the weight allocated to the second costs, to obtain the third costs of executing the query request according to the first plan.

The weight of the first costs and the weight of the second costs may be set as required. For example, when accuracy of the second costs predicted by the second cost prediction layer is higher, the weight of the first costs is set to 0, and the weight of the second costs is set to 1.

Figure 5:
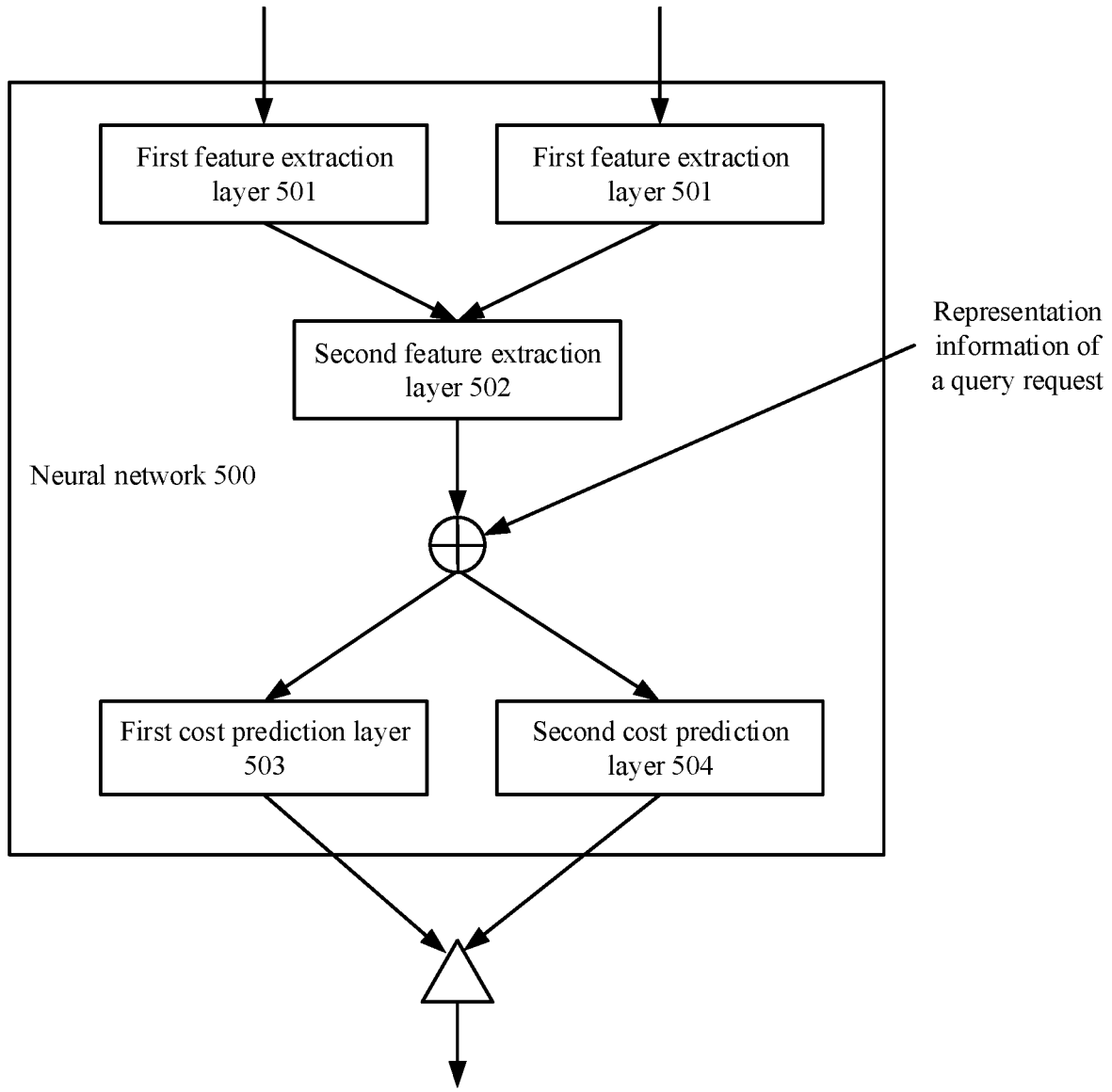
FIG. 5 is a schematic diagram of a structure of a cost prediction module according to this application.

It is assumed that a tree structure is as shown in FIG. 4D. FIG. 5 is a schematic diagram of a structure of a cost prediction module according to this application. The cost prediction module may be implemented by using a neural network.

Refer to FIG. 5. The neural network 500 may include a first feature extraction layer 501, a second feature extraction layer 502, a first cost prediction layer 503, and a second cost prediction layer 504. Each neural network layer may be a complete neural network. In this case, the neural network 500 may be a neural network system, or the neural network 500 may be obtained by training a neural network model. Each neural network layer may alternatively be a unit that implements a corresponding function in the neural network model.

A first join tree and representation information of each leaf node in the first join tree are input into the first feature extraction layer to obtain representation information of the first join tree: a second join tree and representation information of each leaf node in the second join tree are input into the first feature extraction layer to obtain representation information of the second join tree: and the representation information of the first join tree and the representation information of the second join tree are input into the second feature extraction layer to obtain representation information of a tree structure. In FIG. 5, a circle with a cross inside represents a join operation (for example, concatenation). After concatenation is performed, the representation information of the tree structure and representation information of a query request are respectively input into the first cost prediction layer 503 and the second cost prediction layer 504. The first cost prediction layer 503 and the second cost prediction layer 504 respectively obtain and output first costs and second costs. Then, a weighted sum may be calculated (a triangle in the figure represents an operation of calculating the weighted sum) for the first costs and the second costs output by the neural network 500, to obtain third costs of a join order represented by the tree structure. In a training process of the neural network 500, loss functions of a third neural network layer and a fourth neural network layer may be separately calculated, and then a weighted sum of the two loss functions is calculated, to obtain a loss of the entire neural network 500. Alternatively, the loss of the entire neural network 500 may be calculated based on the third costs.

An application scenario of the method provided in the foregoing embodiment may be a cost prediction module in an optimizer. The following describes a method embodiment in this application scenario.

Figure 6A:
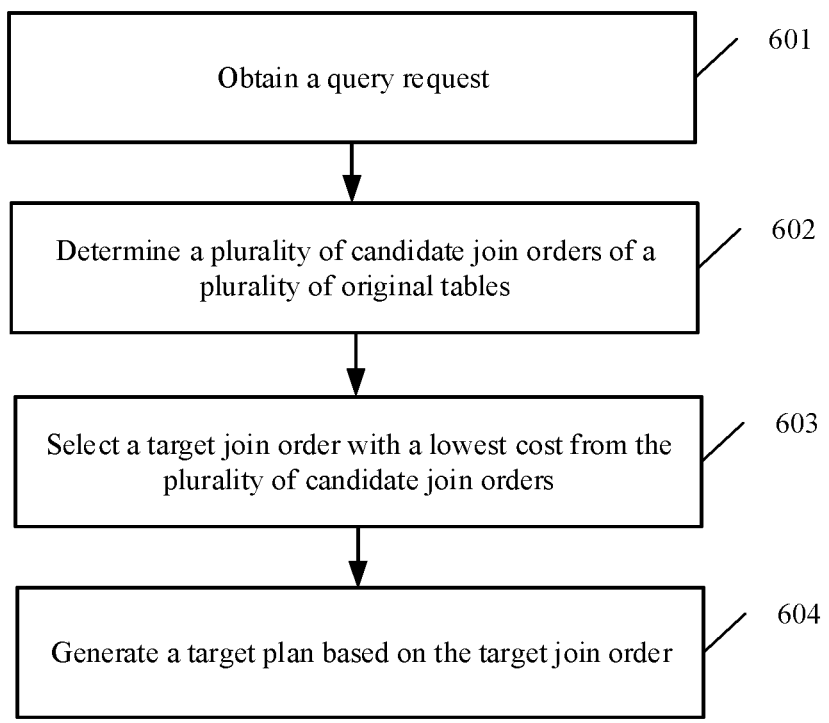
FIG. 6A is a schematic diagram of another embodiment of a database processing method according to this application.

FIG. 6A is a schematic diagram of another method embodiment of this application. The method is applied to an optimizer. With reference to FIG. 6A, another embodiment of the database processing method in this application may include the following steps:

601: Obtain a query request.

The query request is used to operate data in a database, and the operation includes performing a join operation on a plurality of original tables in the database.

602: Determine a plurality of candidate join orders of the plurality of original tables.

603: Select a target join order with lowest costs from the plurality of candidate join orders.

After the plurality of candidate join orders are determined, a plurality of tree structures used to represent the candidate join orders may be obtained, the tree structures each are input into a cost prediction module to obtain costs of each candidate join order, and a join order (referred to as the target join order) with lowest costs is selected from the join orders.

It is assumed that a first join order is any one of the plurality of candidate join orders. In this embodiment of this application, costs of the first join order are costs of executing the query request according to a first plan, the costs of the first join order are determined based on costs that are obtained and output by a cost prediction layer in a neural network based on representation information of a first tree structure after the first tree structure used to represent the first join order is input into the neural network, the first plan is generated based on the join order, the first tree structure includes a first join tree, the first join tree is used to represent one or more join operations for joining at least two original tables in the plurality of original tables, the representation information of the first tree structure is determined based on representation information of the first join tree, the representation information of the first join tree is obtained by a first feature extraction layer in the neural network by allocating a first attribute matrix to each child node based on a location of each child node in the first join tree and performing feature extraction on the first join tree based on the first attribute matrix allocated to each child node in the first join tree, and the first attribute matrix is obtained by learning by the first neural network in a training process.

In step 603, for a process in which the cost prediction module predicts the costs of the candidate join order based on each tree structure, refer to any one of the foregoing method embodiments provided in this application for understanding. Details are not described herein again.

604: Generate a target plan based on the target join order.

The target plan is sent to an execution engine for executing the target plan to obtain a query result of the query request. Then, the query result may be fed back to a database client.

The method provided in this embodiment of this application may be further applied to a database management system. For execution steps of an optimizer in the database management system, refer to the embodiment corresponding to FIG. 6A. After the optimizer generates a target plan, the execution engine may execute the target plan to obtain a query result of the query request. Then, the query result may be fed back to the database client.

Figure 6B:
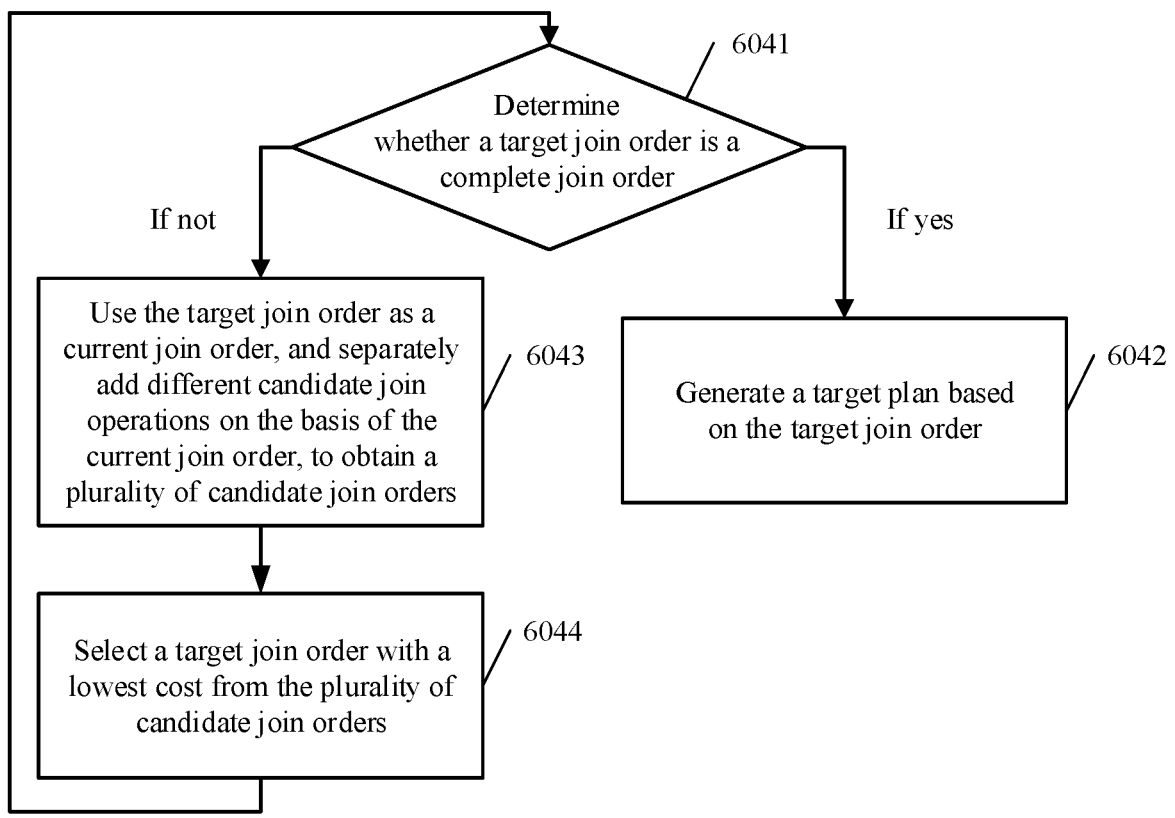
FIG. 6B is a schematic diagram of possible refined steps of step 604 in FIG. 6A.

The optimizer in the embodiment corresponding to FIG. 6A may be obtained through reinforcement learning. With reference to FIG. 6B, in a possible implementation, step 604 may specifically include the following steps:

6041: Determine whether the target join order is a complete join order. If the target join order is a complete join order, perform step 6042: or if the target join order is not a complete join order, perform step 6043.

6042: Generate a target plan based on the target join order.

6043: Use the target join order as a current join order, and separately add different candidate join operations on the basis of the current join order, to obtain a plurality of candidate join orders.

6044: Select a target join order with lowest costs from the plurality of candidate join orders.

Step 6041 may be performed again after step 6044.

Step 6044 may be understood with reference to step 603, and details are not described herein again.

The following provides possible embodiments of the database processing method, which is applied in an optimizer obtained through RL learning.

This application proposes a new optimizer obtained through learning that selects a join order through tree-structured long short-term memory (Tree-LSTM) reinforcement learning. In this embodiment of this application, an existing deep reinforcement learning (Deep reinforcement learning, DRL)-based method is improved mainly from the following two aspects: (1) A graph neural network (GNNs) is used to capture a structure of a join tree: (2) modification of a database schema and modification of a name of a multi-alias table are well supported. A large quantity of experiments show that the optimizer using the method provided in the embodiment of this application is superior to a conventional optimizer and an existing optimizer obtained through DRL learning.

As a key issue in optimization of a database management system, join order selection has been studied for decades. Traditional methods are usually based on cardinality estimation (cardinality estimation) and a cost model, using some pruning technologies to query a solution space including all possible join orders (join orders). In an algorithm based on dynamic programming (DP), an optimal scheme is usually selected at high costs. Through heuristic methods such as GEQO, QuickPick-1000, and GOO, a plan can be processed faster, but a poor plan is usually generated.

Recently, a method of obtaining an optimizer based on machine learning (ML) and deep learning (DL) learning has become popular in a database community (database community). In particular, deep reinforcement learning (DRL)-based methods such as ReJOIN and DQ have shown good results, that is, a plan comparable to a conventional query optimizer can be generated, and an execution speed is much faster after learning.

Disadvantages of the existing DRL-based method are as follows:

In existing DRL-based methods (such as DQ and ReJOIN) for the optimizer obtained through learning, a join tree is encoded as a fixed-length vector, where a length of the vector is determined by tables and columns in a database. This leads to two problems: (1) These vectors cannot represent structural information of the join tree, and consequently, a poor plan may be generated. (2) When the database schema is changed (for example, a column/table is added) or a plurality of aliases are used to represent a table, new input vectors with different lengths are needed. This causes the optimizer obtained through learning to be ineffective, and then a neural network in the optimizer needs to be retrained. This embodiment of this application is further described by using an example.

A database including 4 tables (T1, T2, T3, T4) is used for an example.

Figure 7A:
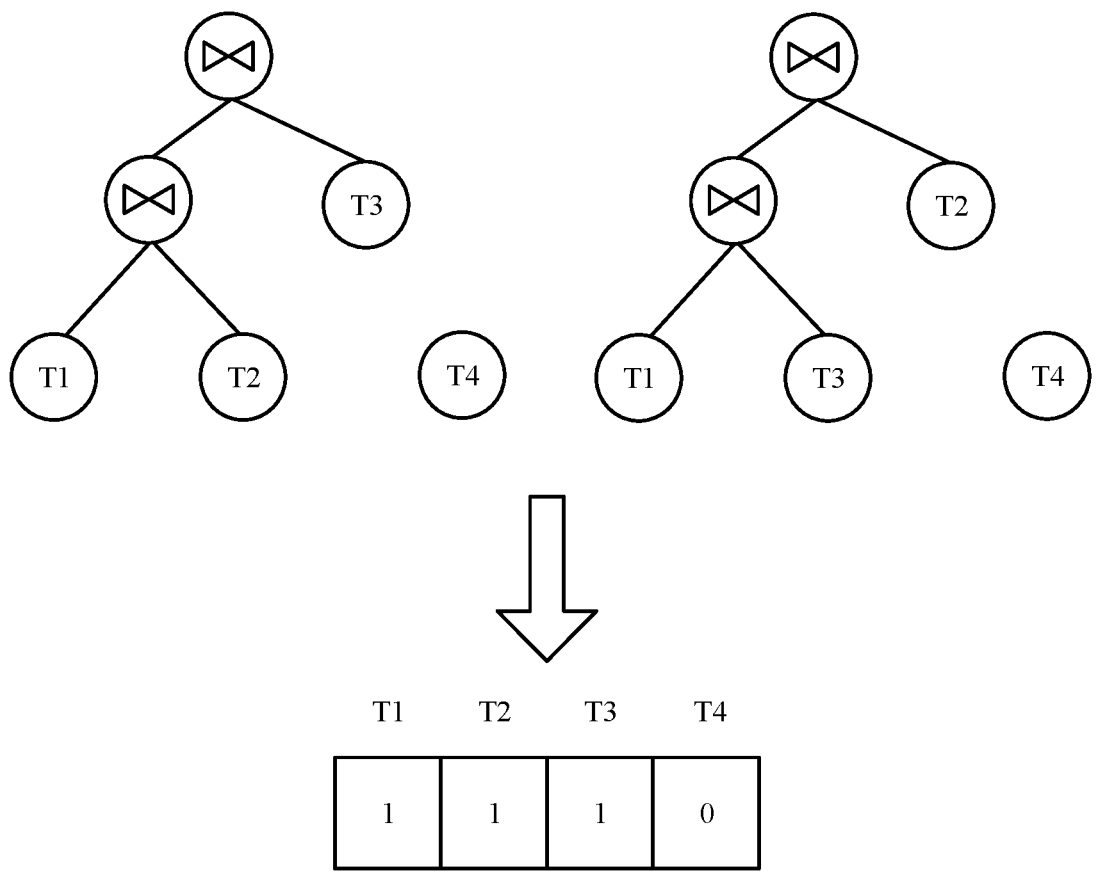
FIG. 7A and FIG. 7B are schematic diagrams of representing join trees in a conventional technology.

DQ encodes the join tree through one-hot encoding (one-hot encoding), where 1 indicates that the table is in the join tree, and 0 indicates that the table is not in the join tree. As shown in FIG. 7A, $(T_1 \bowtie T_2) \bowtie T_3$ and $(T_1 \bowtie T_3) \bowtie T_2$ have a same feature vector [1, 1, 1, 0].

Figure 7B:
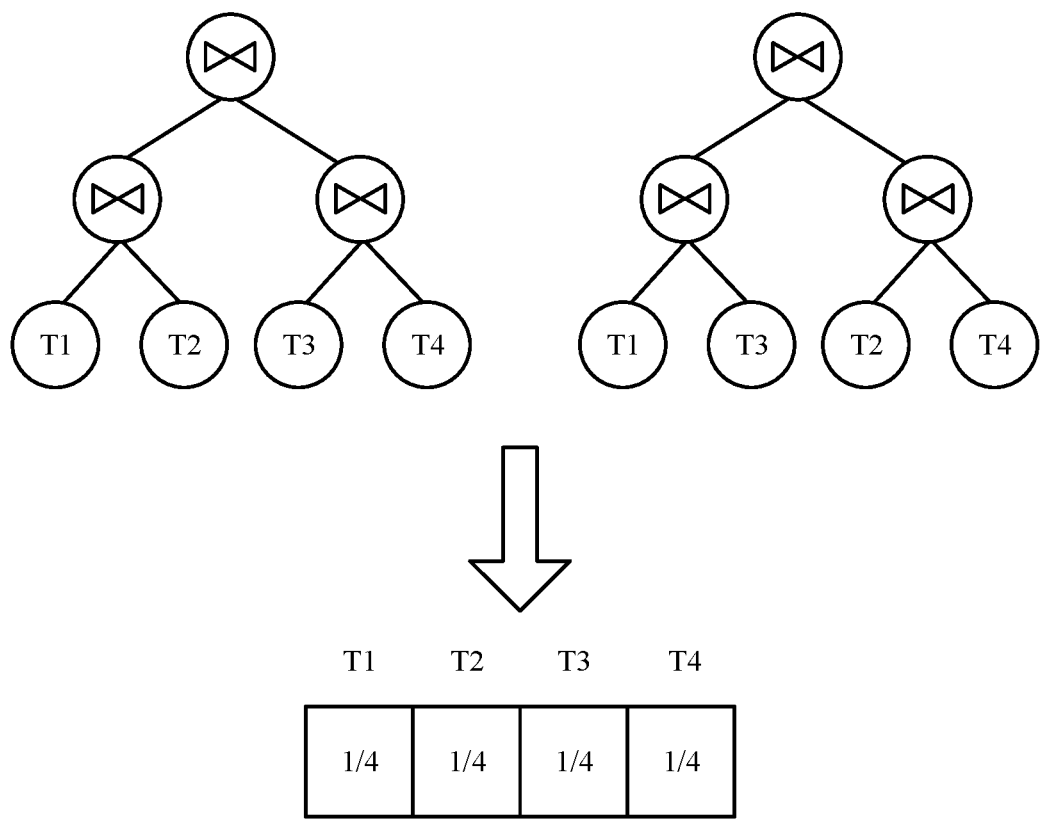

ReJOIN constructs a feature vector of the join tree using a depth in a join table. As shown in FIG. 7B, $(T_1 \bowtie T_2) \bowtie (T_3 \bowtie T_4)$ and $(T_1 \bowtie T_3) \bowtie (T_2 \bowtie T_4)$ have a same feature vector $$\left[\frac{1^d}{2}, \frac{1^d}{2}, \frac{1^d}{2}, \frac{1^d}{2}\right] = \left[\frac{1}{4}, \frac{1}{4}, \frac{1}{4}, \frac{1}{4}\right],$$

where a depth d of each table is equal to 2.

Examples corresponding to FIG. 7A and FIG. 7B indicate that join trees of different join orders may be encoded to obtain a same feature vector (feature vector). It is clear that such an encoding scheme is not ideal because encoding results of the join trees of different join orders should be different.

Methods provided in this application are described below.

According to the foregoing analysis of a conventional technology, a key finding of the embodiments of this application is that an optimizer obtained through better learning needs to be able to understand static information (such as information about a table and a column) in a join tree, capture structural information in the join tree, and handle (frequent) changes in a database schema and a name of a multi-alias table that are common in an SQL query. To verify the above finding, an embodiment of this application provides a new optimizer obtained through Tree-LSTM learning to train a DRL model, where the model can automatically improve future join order selection by learning previously executed queries.

A tree-LSTM is a graph neural network (graph neural network, GNNs). Use of the GNNs in graphically structured data has shown good performance in various applications, such as social networking and knowledge graph. Different from a conventional LSTM structure that uses serial data as an input, the tree-LSTM directly reads a tree structure as an input and outputs representation information of the tree. In this embodiment of this application, tree-based representation information may be used to overcome a disadvantage in the conventional technology. In addition, in this embodiment of this application, a dynamic graph feature (dynamic graph feature) is used to support modification of a database schema and a multi-alias problem of a table name, to resolve the disadvantage in the conventional technology.

A basic objective of this embodiment of this application is to generate a plan with a low latency (for example, a low execution time). However, costs of estimating the latency are much higher than costs of estimating costs (which is estimated by a cost model). In this embodiment of this application, costs are first used as feedback to train the model, and then a latency is used as feedback to perform fine tuning. Different from a method of using only a latency as feedback, in this embodiment of this application through multi-task learning, the two pieces of feedback are considered as two independent tasks sharing one common representation information (sharing one common representation). In this way, the model can learn both the costs and the latency by setting an objective loss function (objective loss function) as a weighted sum of the costs and the latency.

There may be concern that training a deep neural network requires a large amount of time and data used for training. Similar to verification in DQ, training data needs to be obtained by continuously generating a join plan of a query statement and interacting with an execution engine to obtain feedback. Therefore, efficiency of a DRL-based optimizer is low.

The following describes main contributions and ideas of this embodiment of this application.

In the method provided in this embodiment of this application, DRL with a Tree-LSTM is used to resolve a JOS. The following describes this embodiment of this application from the following four aspects:
1. An overview of the method in this embodiment of this application is provided.
2. A method of representing an intermediate join plan (for example, a join forest) is introduced, where the method combines representation of a given query with representation of a join tree in the join tree through the tree-LSTM.
3. How to use Deep Q learning to resolve a DRL problem of join order selection is described.
4. How a database modification, for example, adding a column or table, and a plurality of aliases of the table, is processed in the method in this embodiment of this application is discussed.

The following describes the four aspects in sequence.

According to a first aspect, in this embodiment of this application, a main focus of this embodiment of this application is an SPJ query, which is similar to DQ. In the method in this embodiment of this application, DRL with a Tree-LSTM (DRL with a Tree-LSTM) is used to train an optimizer obtained through learning. The optimizer outputs a join plan (join plan) for a given SQL query. An execution engine executes the join plan and sends feedback. In the method in this embodiment of this application, the join plan and the feedback are used as a new training sample to optimize a parameter.

The following specifically describes a working process of the method in this embodiment of this application.

A. The following first describes a working mechanism of the method in this embodiment of this application.

(1) Deep reinforcement learning:

Reinforcement learning (RL) is a method in which an agent (for example, an optimizer) interacts with an environment (for example, the execution engine) in a trial-and-error manner to obtain feedback, and learns from the feedback. RL is usually combined with deep learning (DL). For each state (for example, an intermediate join order), the method in this embodiment of this application computes of an estimated long term reward (for example, feedback from the execution engine) of each action (for example, joining two tables to make a current state more complete) by using a neural network based on the Tree-LSTM. Then, the method in this embodiment of this application selects a desired optimal action with a largest reward (or lowest execution costs). When all tables are joined (that is, a complete join order is obtained), an execution plan of a query statement may be generated based on the join order, and the execution plan is sent to the execution engine for execution. Then, the method in this embodiment of this application receives feedback from the execution engine to train the Tree-LSTM and update the optimizer.

(2) A latency and costs are used as feedback:

In this application, two types of information from the execution engine are used as feedback: the latency and the costs. The latency is an actual execution time of the join plan and is a basic objective of optimization. However, it can only be obtained by executing an SQL query statement, which is high in costs. The costs are an estimate of the latency, are usually given by the cost model, and are usually inaccurate.

In this embodiment of this application, an advantage of high efficiency of the costs is used to train the Tree-LSTM (learner), and the latency is further used as feedback for training. For details, refer to the following two steps:

1. Cost-based training: First, an RL model is trained by using the costs as feedback (or reward). After this phase is completed, a model in this embodiment of this application can generate a good plan using the costs as an indicator. In addition, the neural network has some understanding of a cost-based database.

2. Latency-based training: Further, the latency is used as feedback and is used as a new target for optimization. Through cost-based training in the previous step, the neural network has a general understanding of the database. On this basis, this embodiment of this application performs continuous training by using latency information. Therefore, this step may be considered as fine tuning of the neural network.

B. The following describes a system framework of the method in this embodiment of this application.

Before describing the framework, a state (state) is first introduced, which is the key to a learning process.

Informally, a state in a joining process is a join tree, which may include two or more join trees.

It is assumed that the SQL query (or a query request) is:
"Select *
From T1, T2, T3, T4
where T1.a=T2.a
and T3.b=T4.b
and T1.c=T3.c".

Figure 8:
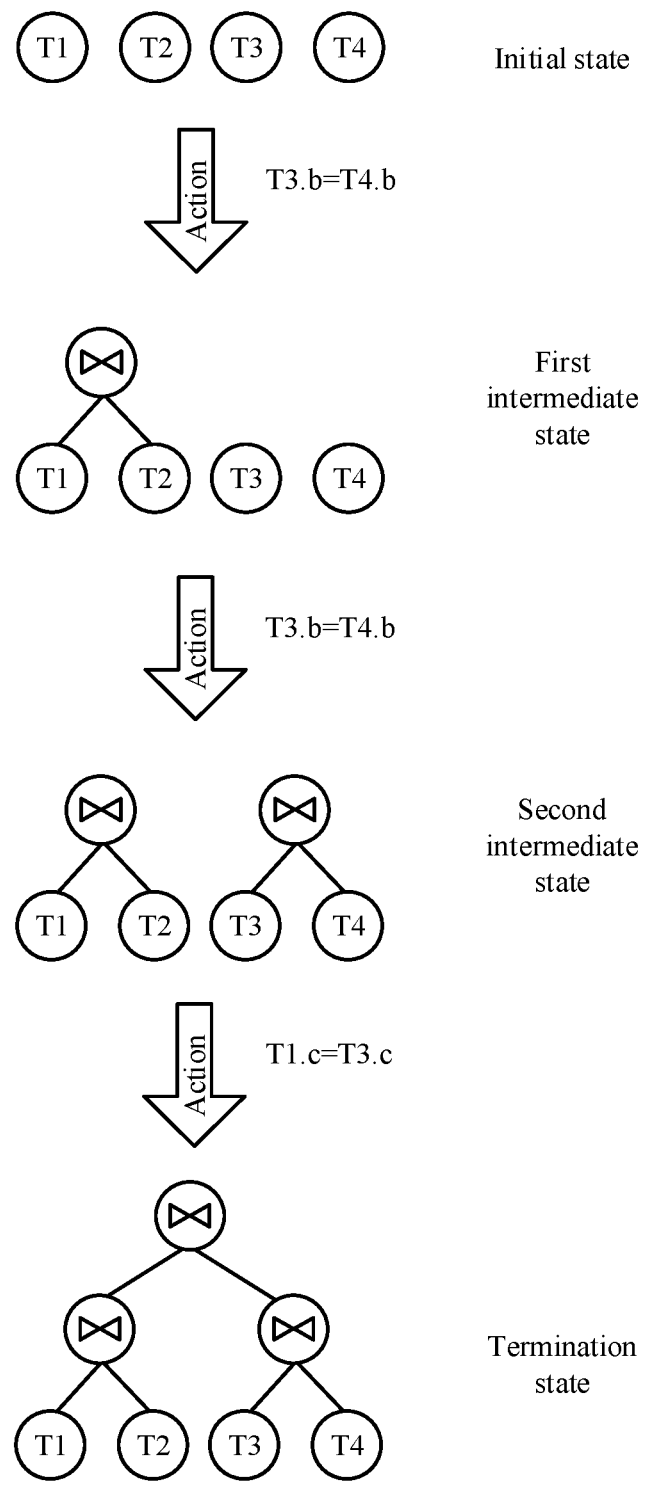
FIG. 8 is a schematic diagram of a process of selecting a complete join order based on a reinforcement learning method in this application.

A corresponding initial state is a join forest having four join trees T1, T2, T3, and $T_4$. With reference to FIG. 8, a first intermediate state is a join forest with three join trees (($T_1 \bowtie T_2$), $T_3$ and $T_4$): and a second intermediate state is a join forest with two join trees (($T_1 \bowtie T_2$) and ($T_3 \bowtie T_4$)). A termination state is a complete plan with only one join tree.

Figure 9:
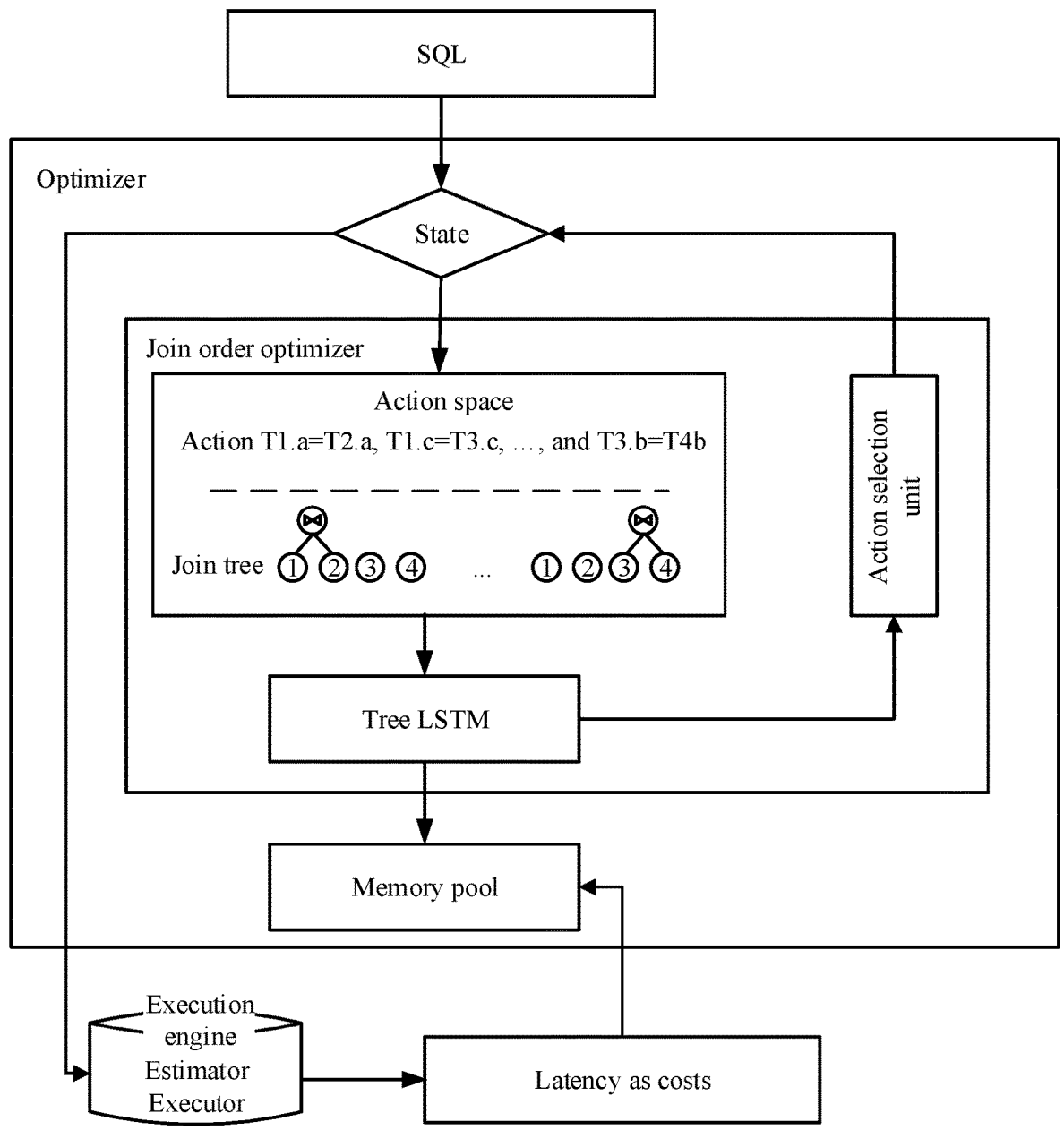
FIG. 9 is a schematic diagram of a system framework according to a method embodiment of this application.

The following describes the system framework of the method in this embodiment of this application, as shown in FIG. 9.

(1) A DRL optimizer: is an optimizer obtained through learning. The DRL optimizer includes a state module, a join order optimizer, and a memory pool (memory pool).

The state module is configured to maintain information about a current state during the joining process. The termination state is a join tree that joins all tables together, and is to be converted into a query plan (or an execution plan) and transferred to the execution engine for execution. The intermediate state is a state that includes some join orders, and is transferred to the join order optimizer for selecting an action (action) to be performed (perform) now. The state module performs updating based on the selected action.

The join order optimizer corresponds to the agent (agent) in RL, and is a core part of the entire system. For a given state, each candidate join condition can be considered as an action. An action space (ActionSpace) includes all possible actions and corresponding join trees (for example, {(T1.a=T2.a, joinTree(T_1.a=T_2.a)), . . . }). In this embodiment of this application, the join tree in the action space is represented by using tree-LSTM, and a corresponding estimated long term reward is obtained. An action selection unit in the join order optimizer is configured to obtain an estimated long term reward (estimated long term reward) of each join tree from the tree-LSTM, and select an action corresponding to an optimal join tree:

$$\text{action} = \underset{\text{action}' \in Actionspace}{\arg\min} TreeLSTM(joinTree(\text{action}')).$$

The memory pool records a status of the plan (status of the plans) generated by the method in this embodiment of this application and feedback of the execution engine. DRL requires training data to train the neural network. A conventional practice is using a replay memory (replay memory) to record a status of the execution plan and feedback of the system. In this embodiment of this application, a memory pool (memory pool) is used, and training data is extracted from the memory pool to train the tree-LSTM.

2) Database management system:

The DRL optimizer generates a join plan for a given query and transfers the join plan to the execution engine, for example, a database PostgreSQL. In this embodiment of this application, two components of the execution engine are used: an estimator (namely, the foregoing cost prediction module) and an executor. When the executor is not run, the estimator may estimate costs of the plan by using statistics.

It is difficult to obtain a latency of each join condition. To reduce implementation difficulty and make the system easy to be ported to another system, a typical method is used in this embodiment of this application. This method is also used in ReJoin and DQ. In this embodiment of this application, feedback (reward) of each step in the intermediate state is set to 0, and feedback of the termination state is set to costs (latency) of the entire plan.

The second aspect describes representation of a state:

To learn representation (representation) information R(s) of a state s, both a current state (namely, a join forest F) and a target status (target status) (namely, an SQL query q) need to be considered in this embodiment of this application. The representation information R(s) of the state s is a concatenation (concatenation) result of representation information R(F) of the join forest F and representation information R(q) of the query q, that is, $R(s)=R(F) \oplus R(q)$, where $\oplus$ is used to represent a concatenation operation.

Next, the following content is described in sequence: that the representation information R(q) of the query q is represented as a vector: that representation information of columns and tables in a given query is represented as a vector: how to use the tree-LSTM to learn representation information of a join tree based on the representation information of the columns and tables: and the representation information R(F) of the join forest and the representation information R(s) of the state s.

Table 1 shows meanings of identifiers used in this embodiment of this application.

TABLE 1

| Symbol | Interpretation |
|--------|----------------|
| n | Quantity of tables in the database |
| R(c) | Representation information of a column c |
| R(t) | Representation information of a table t |
| T | Join tree |
| R(T) | Representation information of the join tree |
| F | Join forest including several join trees |
| R(F) | Representation information of the join forest |
| R(q) | Representation information of the SQL query q |
| θ | Join condition in a query |
| Θ | All join conditions in a query |
| s | Join state in the joining process |
| R(s) | Representation information of the join state s |
| hs | Size of a hidden layer in the neural network |
| A | All actions in RL |
| A( ) | Action space including all the actions |
| M | Attribute matrix of the column c in the neural network |
| F(c) | Feature vector of the column c |

A. The representation information of the query q:

The representation information R(q) of the query q is a vector that includes all join information of each table related to q.

It is assumed that the quantity of tables in the database is n, and the tables are uniquely identified as numbers from 0 to n-1. It is set that m is an n*n matrix, where each element is 0 or 1. If there is a join relationship between an $i^{th}$ table and a $j^{th}$ table, $m_{i,j}$ is 1; otherwise, $m_{i,j}$ is 0. All rows from a row 0 to a row (n-1) of the original matrix m are converted into vectors, to flatten (flatten) the matrix into a vector, that is, $V_{i*n+j}=m_{i,j}$, $|v|=n*n$.

It is assumed that the query q is:
"Select *
From T1, T2, T3, T4
where T1.h>30 and T1.h<50
and T1.a=T2.a
and T2.b=T3.b
and T1.c=T4.c".

Then, a vector v is input into a fully connected (FC) layer (refer to FIG. 10A), to obtain the representation information of q:

R(q)=FC(v)=σ(vW+b), where

σ is an activation function (for example, tanh, Sigmoid, and ReLU) in the neural network, W (a matrix having a shape (n*n, hs)) and b (a vector having a shape (1, hs)) are parameters in the FC layer and need to be obtained by learning by using the training sample, hs is the size of the hidden layer in the neural network, and R(q) is a vector of a shape (1, hs) and is used to represent the query q.

The foregoing provides an improved method of representing a query statement based on a matrix. The method is used to learn the query statement, and can resolve a problem of modification of a database schema and a multi-alias problem of a table name.

B. Representation information of columns and tables:

The column and table are two key elements in the query statement. Next, in this embodiment of this application, the representation information R(c) of the column c is first discussed, and then the representation information of the column t is constructed by using the representation information of the column.

B1. Representation information of the column:

In this embodiment of this application, two types of columns are considered: a numerical value and another type of value (for example, a string). It should be noted that in the query statement, the column c may be associated with two operations: a join operation and a select operation, both of which may be considered. Particularly, in this embodiment of this application, information about the select operation may be encoded into the representation information R(c) of the column c. It may be considered that information about all select operations is placed into leaf nodes (leaves) of the join tree.

(i) For the column c consisting of numerical values, the select operation may be divided into three cases: "=, >, and <". Therefore, in this embodiment of this application, the column c may be encoded as a feature vector whose length is 4: $F(c)=(c_{\bowtie}, c_=, c_>, c_<)$. If the column c has a join predicate, $c_{\bowtie}=1$: if the column c does not have a join predicate, $\bowtie=0$. For other three select operations, because a value in the predicate is important, it is not enough to perform encoding for only indicating whether the operation exists. For example, given a predicate c>v, a value v should be used as a feature. Because data in different columns has different scales (scales), in this embodiment of this application, values in the columns are normalized to an interval [0, 1] based on a maximum value ($c_{max}$) and a minimum value ($c_{min}$) in the columns. This embodiment of this application separately describes the three cases below.

For a case of a predicate c=v, if $v<c_{min}$, or, $v>c_{max}$, because no data is obtained, $c_==-1$: other than this, $$c_= = v_{nor} + 1 = \frac{v - c_{min}}{c_{max} - c_{min}} + 1.$$

For a case of the predicate c>v, if $v \geq c_{max}$, C>=1: if $v<c_{min}$, C>=0; otherwise, $c_>=v_{nor}$.

For a case of a predicate c<v, if $v \leq c_{min}$, C<=1; if: if $v>c_{max}$, $c_<=0$; otherwise, $c_<=1-v_{nor}$.

Figure 10A:
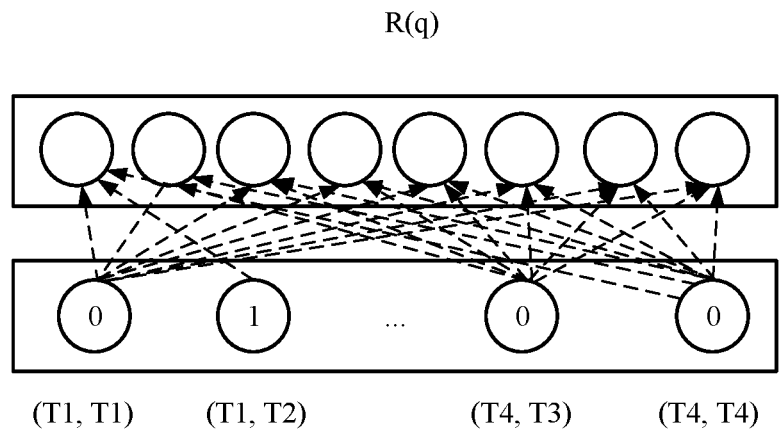
FIG. 10A is a schematic diagram of a process of generating representation information of a query request according to this application.

Considering a query in FIG. 10A, a feature vector $F(T_1.h)=(0, 0, 0.3, 0.5)$ of a column h of a table T1 is obtained. A column $T_1.h$ has no join condition and no "=" predicate. Therefore, $c_==0$, and $c_{\bowtie}=0$. Because a maximum value and a minimum value of T1.h are 0 and 100 respectively, for T1.h>30, $c_>=0.3$ is set in this embodiment of this application: for T1.h<50, $c_<=1-0.5=0.5$ in this embodiment of this application.

In this embodiment of this application, a matrix M(c) is defined for each column c, of a shape of (4, hs). M(c) learns parameters that include column information. The representation information R(c) of a numerical column whose shape is (1, hs) is:

R(c)=F(c)*M(c).

If the column c has predicates connected by "or", these predicates can be processed separately, and then one piece of representation information can be obtained by using a max pooling (max pooling) operation.

(ii) For columns of other types of values (for example, a string), it is not possible to map the column to values with meaning (">", "<") of an interval by using a simple method (for example, hash), but a more complex encoding method (for example, word2vec) is required. Herein, in this embodiment of this application, the column is encoded by using only selection information of the column, and representation information of the column is obtained.

To align the foregoing representation vectors, in this embodiment of this application, a vector whose length is 4 may be further used to encode the column, namely, ($c_{\bowtie}$, $c_=$, $c_>$, $c_<$). $c_{\bowtie}$ may be calculated according to the foregoing method. Because an interval meaning of a column of the string cannot be directly represented by using a numerical value, in a possible implementation, $c_>=0$, $c_<=0$. For $c_=$, a predicate v is given, a selection of v is estimated by using a histogram this embodiment of this application, and $c_=$ is set as the estimated selection.

Figure 10B:
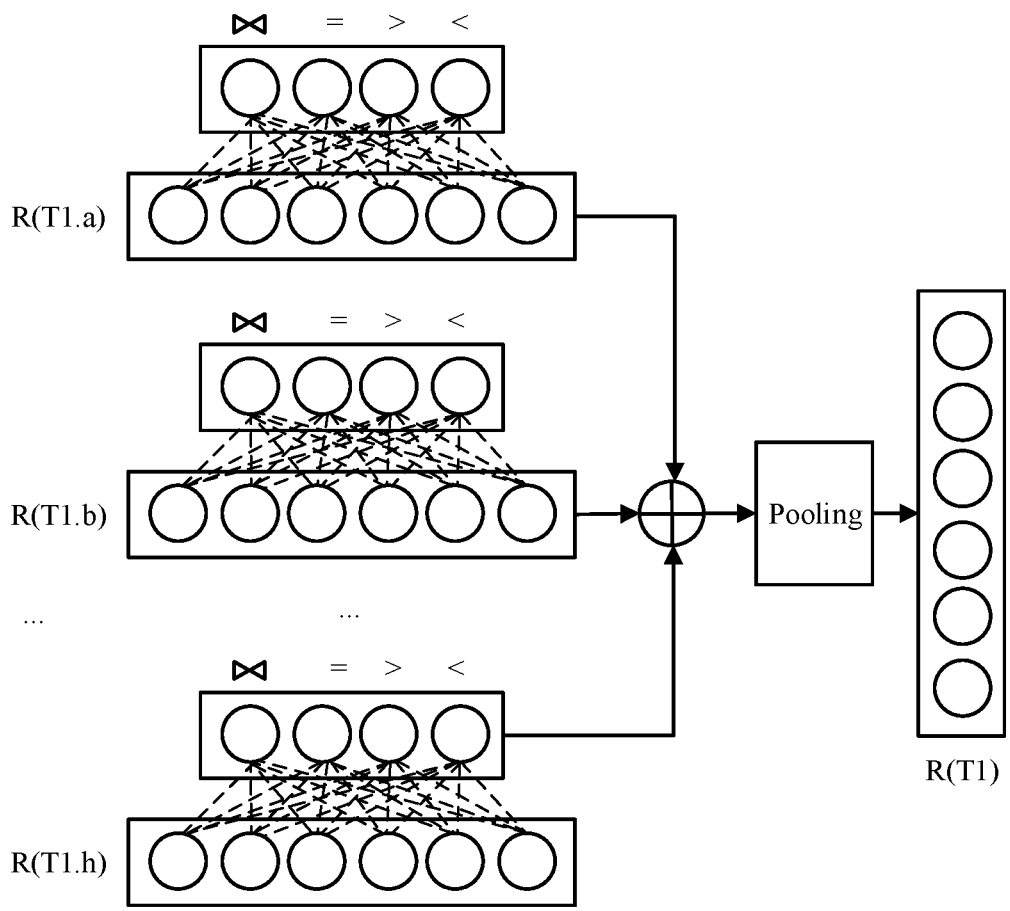
FIG. 10B is a schematic diagram of a process of generating representation information of a table according to this application.

B2. The representation information of the table:

For a table t that has k columns, in this embodiment of this application, representation information of each column in the table is used to construct the representation information R(t) of the table. More specifically, in this embodiment of this application, representation information ($R(c_1)$, $R(c_2)$, . . . , $R(c_k)$) of the k columns is concatenated (concatenate) to obtain a matrix M(t). A shape of the matrix M(t) is (k, hs), and $M(t)=(R(c_1) \oplus \ldots \oplus R(c_k))$. With reference to FIG. 10B, an average pooling layer (average pooling layer) (with a kernel shape of (k, 1)) is used to obtain representation information (or referred to as a representation vector) of the table, where a shape of the representation information is (1, hs). The representation information is as follows:

R(t)=MaxPool(M(t)).

C. Representation information of a join tree, a join forest, and a state:

This embodiment of this application below first describes how to learn the representation information of the join tree by using the tree-LSTM. The join tree is a graphical structure, and it is difficult to directly obtain the representation information of the join tree by constructing a feature vector.

(1) Tree-LSTM:

A conventional LSTM shows an ability of obtaining continuous data features even for a long sequence (for example, in natural language processing). There is an input sequence $X=(x_1, x_2, x_3, \ldots)$ in this embodiment of this application. At each time step i, a hidden state vector (hidden state vector) h; is used to represent a current state (state) at the time step i, and a memory cell vector mi holds long-term information of $x_1, x_2, \ldots, x_i$ to process a long sequence. The LSTM uses an LSTM unit (LSTMUnit) to obtain $h_i$ and $m_i$, $h_i$, $m_i$=LSTM unit $(x_j, h_{i-1}, m_{i-1})$ by using input $x_i$ and representation information $(h_{i-1}, m_{i-1})$ obtained at a time step i−1.

However, the conventional LSTM reads a data sequence and cannot be directly applied to complex data structures such as a tree. To address this limitation, child-sum tree-LSTM and N-ary tree-LSTM can be used to process tree-structured data. For a given tree, the tree-LSTM can automatically learn structure information of the tree and provide representation information of the tree.

The child-sum tree-LSTM does not consider an order of child nodes in a tree. For a given tree node j having several child nodes $\alpha_{jk}$, the child-sum tree-LSTM sums (sum) up representation information of all the child nodes and then constructs representation information of the tree node j.

The N-ary tree-LSTM considers an order of child nodes in a tree. For a given tree node j, representation information of a $k^{th}$ child node $\alpha_{jk}$ in the tree node j may be calculated separately. The kth child node will have its own weight matrix w.r.t.k. Information of the order may be obtained by using these weight matrices associated with locations.

The two types of tree-LSTMs can be combined based on characteristics of the join forest (join forest). The join tree F consists of several join trees $\{T1, T2, \ldots\}$. Without any human feature (human feature) of the tree structure, representation information R(T) of a tree T can be automatically learned by using a model with the join tree as an input.

Figure 10C:
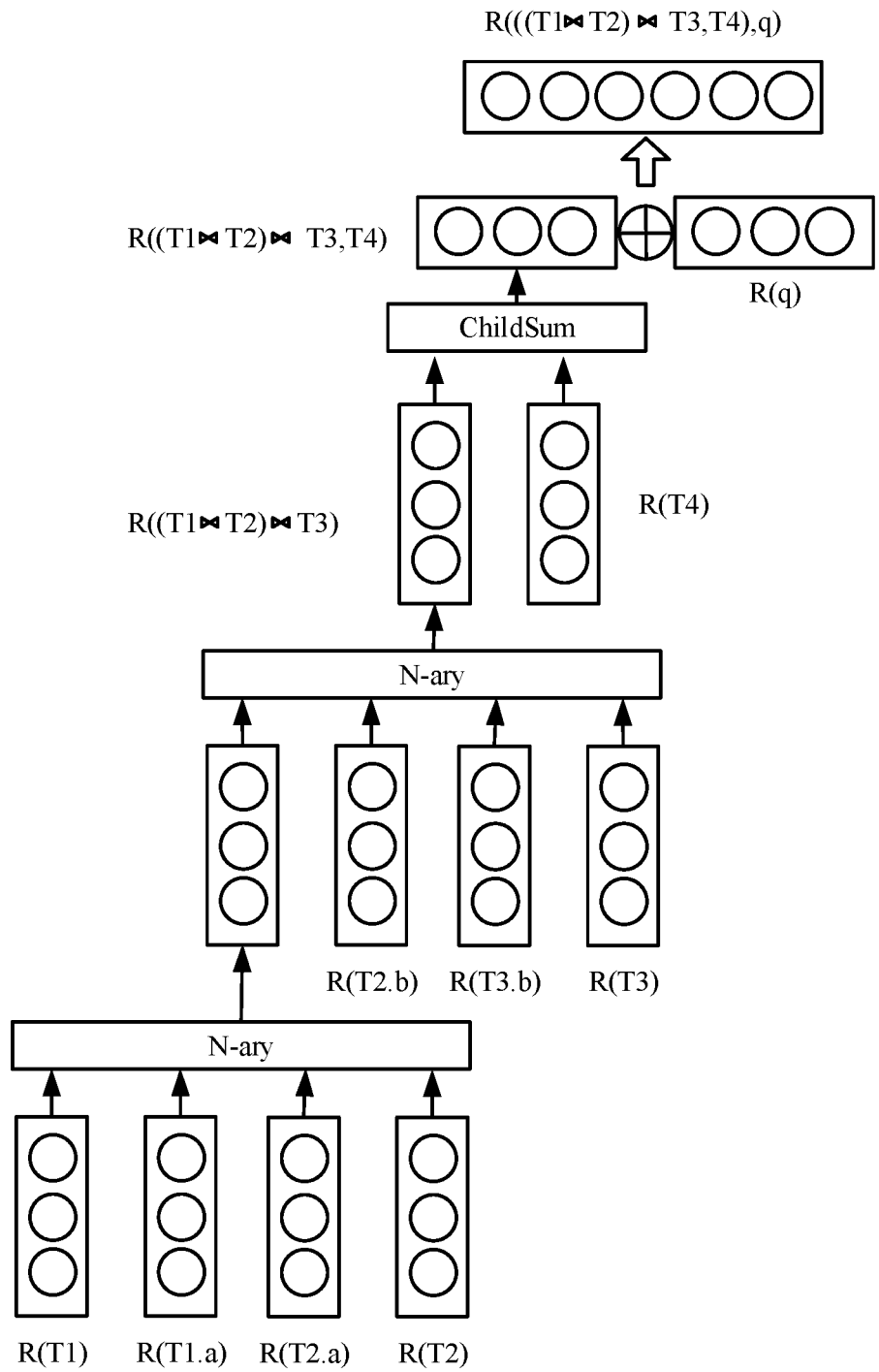
FIG. 10C is a schematic diagram of a tree model constructed for a join order in this application.

(2) Representation information of the join tree:

As shown in FIG. 10C, in this embodiment of this application, a tree model is constructed for a join order. A leaf node may be a table or a column. An internal node of a join tree corresponds to a join consisting of four child nodes $(\alpha_0, \beta_0, \beta_1, \alpha_1)$. $\alpha_0$ and $\alpha_1$ are two join trees that need to be joined, or two tables that need to be joined, or a join tree and a table that need to be joined. $\beta_0$ and $\beta_1$ is a corresponding column in the join. $\alpha_0, \beta_0, \beta_1,$ and $\alpha_1$ are sensitive to locations, and therefore, the N-ary tree-LSTM may be applied to the join tree.

For the tree node j, in this embodiment of this application, $h_j$ represents representation information of a state, and $m_j$ represents a storage unit of the tree node j.

1. If the node j represents a leaf node of a single table, $h_j$=R(j), and $m_j$ is initialized to a zero vector.
2. If the node j represents a leaf node of a single column, $h_j$=R(j), and $m_j$ is initialized to a zero vector.
3. If the node j represents a join, the node j has four child nodes $(\alpha_{j,0}, \beta_{j,0}, \beta_{j,1}, \alpha_{j,1})$. Representation information of the four child nodes may be input into an N-ary unit (Unit) of the N-ary Tree-LSTM, to obtain $h_j$ and $m_j$.

Formulas for the N-ary unit in the N-ary tree-LSTM to represent the node j are as follows:

$$i_j = \sigma(W_0^i h_{\beta_{j,0}} + W_1^i h_{\beta_{j,1}} + U_0^i h_{\alpha_{j,0}} + U_1^i h_{\alpha_{j,1}} + b^i);$$

$$f_{j,0} = \sigma(W_0^f h_{\beta_{j,0}} + W_1^f h_{\beta_{j,1}} + U_{0,0}^f h_{\alpha_{j,0}} + U_{0,1}^f h_{\alpha_{j,1}} + b^f);$$

$$f_{j,1} = \sigma(W_0^f h_{\beta_{j,0}} + W_1^f h_{\beta_{j,1}} + U_{1,0}^f h_{\alpha_{j,0}} + U_{1,1}^f h_{\alpha_{j,1}} + b^f);$$

$$o_j = \sigma(W_0^o h_{\beta_{j,0}} + W_1^o h_{\beta_{j,1}} + U_0^o h_{\alpha_{j,0}} + U_1^o h_{\alpha_{j,1}} + b^o);$$

$$u_j = \tanh(W_0^u h_{\beta_{j,0}} + W_1^u h_{\beta_{j,1}} + U_0^u h_{\alpha_{j,0}} + U_1^u h_{\alpha_{j,1}} + b^u);$$

$$m_j = i_j \odot u_j + f_{j,0} \odot m_{\alpha_{j,0}} + f_{j,1} \odot m_{\alpha_{j,1}}; \text{ and}$$

$$h_j = o_j \odot (\tanh(m_j)).$$

i, f, o, u are intermediate neural networks during computation, each corresponding to each gate (gate). This helps capture long-term information (a deep tree or a long sequence) in the conventional LSTM. $W_p^*, U_{o,p}^*, U_{i,p}^*, b_p^*, * \varepsilon \{i, f, o, u\}, p \varepsilon \{0,1\}$ are parameters in the neural network that correspond to locations of the gates and nodes, and are trained to minimize a given loss function.

In this embodiment of this application, an N-ary unit is defined. The N-ary unit may calculate representation information of one node. In this embodiment of this application, the N-ary unit may be used to obtain the representation information of the join tree. By using a dynamic graph feature of PyTorch, a computation graph of the neural network can be constructed after a join tree is obtained. In this embodiment of this application, depth first search (Depth FirstSearch, DFS) is used to traverse the join tree and generate the computation graph, as shown in Function JoinTreeDFS ( ) A state $h_j$ of a root node in each join tree may be considered as the representation information R(T) of the join tree T, where R(T)=$h_j$.

(3) Representation information of the join state:

The join state s consists of a query statement q and a join forest F={T1, T2, . . . }.

For the query statement q with m tables to be joined, m-1 join trees are obtained after l times of joins. Unjoined join trees are out of order. Any two tables may be joined at a next joining time. To represent a combination (combination) of these join trees, in this embodiment of this application, a root node is used to represent the join forest, and child nodes of the join forest are m-l join trees. There is no specific location between the join trees in the join forest, and the child-sum tree-LSTM may be used herein to obtain an output $h^{root}$ of the root node. Equations of units (equations of unit) of the root node of the child-sum tree-LSTM are as follows:

$$h = \Sigma_k h_{T_k};$$
$$i = \sigma(U^i h + b^i);$$
$$f_k = \sigma(U^f h_k^{root} + b^f);$$
$$o = \sigma(U^o h + b^o);$$
$$u = \tanh(U^u h + b^u);$$
$$m^{root} = i \odot u + \Sigma_k f_k \odot m_{T_k}; \text{ and}$$
$$h^{root} = o \odot \tanh(m^{root}).$$

i, f, o, u are intermediate neural networks during computation, each corresponding to each gate in the conventional LSTM. The parameters $U^*, b^*, *\varepsilon\{i, f, o, u\}$ in the equations are parameters that need to be trained in the neural network. These parameters are different from the parameters in CSUnit of N-ary Unit. The representation information $h^{root}$ of the root node may be considered as the representation information R(F) of the join forest, that is, R(F)=$h^{root}$. After the representation information of the join forest F and the representation information of the query statement q are obtained, the two pieces of representation information may be concatenated (concatenate) to obtain the representation information of the join state s.

R(s)=R(F) @ R(q), where

R(F) and R(q) are vectors of a shape of (1, hs), and R(s) is a vector of a shape of (1, hs*2).

A third aspect describes deep reinforcement learning in the method in this embodiment of this application:

After the JOS is mapped to an RL problem and the representation information of the join state is described, a next objective of this embodiment of this application is to resolve the RL problem and to provide a join plan with lower costs (or a smaller latency). In view of this, a deep Q network (deep Q network, DQN) is used in this embodiment of this application.

A. The DQN is applied to selection of a join order:

Q-learning (Q-learning) is a value-based RL algorithm. Q-learning lists all actions and chooses the best one. For the JOS, an action space $A(s)=\{(A_1, S_1), (A_2, S_2), \ldots )\}$, corresponds to all possible join conditions $\theta_i$, where $A_i=\theta_i$, and si represents a new state to which the current state s migrates after an action $A_j$ is performed. In this embodiment of this application, Q-value Q(s) is defined, from a function, as expected lowest costs (or a latency) of an optimal join plan based on the join state s. In this embodiment of this application, a formula of Q may be obtained as follows:

$$Q(s) = \begin{cases} \text{cost (latency), } s \text{ is a final state.} \\ \min_{(A',s') \in A(s)} Q(s'), s \text{ is not a final state.} \end{cases}$$

Similar to dynamic programming (dynamic programming), Q-learning uses a Q-table (Q-table) to compute Q(s). The Q-table uses a table to correlate and record all known states and values of the states, that is, record state-value pairs (s, Q(s)). If the state s is recorded in the Q-table, when the value Q(s) of the state s is queried, Q(s) is directly returned, or according to the foregoing formula, the action space A(s) is traversed to search for a query Q(s') through recursion to the Q-table, to obtain Q(s) through computation.

A policy function (policy function) x(s) is used to return a selected optimal action for the given state s. Once the Q-table is obtained, the Q-table may be used to guide the policy function. Then, the policy function x(s) can be obtained as follows: $x(s) = \arg\min_{(A',s') \in A(s)} Q(s')$.

However, Q-learning, as dynamic programming, requires a large Q-table, which requires large memory space and time to list all states.

The DQN optimizes Q-learning. The DQN uses a neural network (Q-network) instead of the Q-table to estimate an unknown state based on a known state. The foregoing describes how to obtain the representation information R(s) of the join state s. The following generates a Q-network based on $Q_{nn}(R(s), w)$, where w is a parameter of the Q-network.

One episode (episode) means a complete process in which the method in this embodiment of this application generates a join plan and obtains feedback v. For each state s in this episode, similar to Q-learning, a target value of $Q_{nn}(R(s), w)$ V=min(v, $m_i$ $n(A',s')EA(s)$ $Q_{nn}(R(s), w)$. A difference between $Q_{nn}(R(s), w)$ and the corresponding target value, that is, $\delta(R(s))=Q_{nn}(R(s), w)-V$, can represent accuracy of a result of estimation by the Q-network on the state s. A value of the difference closer to zero indicates a better estimation result. In this embodiment of this application, an L2 loss is used to define a loss function (loss function) of the Q-network, and the loss needs to be minimized to train Q-network: Loss $(R(s))=(\delta(R(s)))^2$.

B. Multi-task learning of a join loss function of costs and a latency:

In the method in this embodiment of this application, costs or a latency needs to be selected. In this embodiment of this application, it is expected that the RL can provide a shortest execution time, but each step requires too much time to obtain feedback. A cost model can quickly give estimated costs, but may not be accurate. As mentioned above, a training process may be divided into two steps: cost training and latency tuning (latency tuning). When latency tuning is performed, an objective is directly shifted from costs to latency in the conventional technology. When a large amount of new training data is needed (for example, during modifying of a database schema), cost training and latency tuning may be considered as two similar tasks and used together to train the neural network, to obtain both high efficiency by using costs and high accuracy by using latency tuning. This idea is derived from multi-task learning, which shares representation information of the neural network and obtains outputs of a plurality of tasks. In the method provided in this embodiment of this application, two Q-networks: $Q_{nn}^L$ and $Q_{nn}^C$ are used to respectively obtain a Q-value (Q-value) $Q_{nn}^L$ of the latency and a Q-value $Q_{nn}^C$ of the costs.

Figure 11:
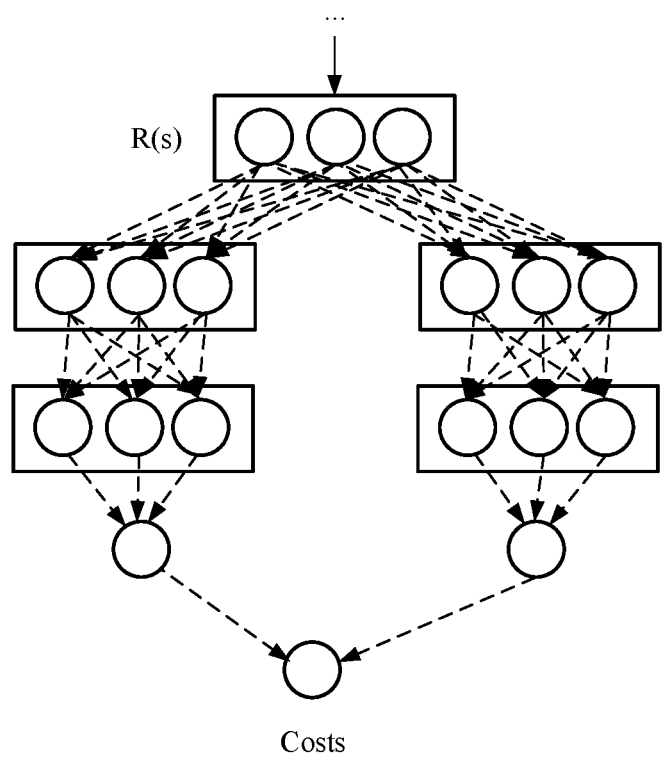
FIG. 11 is a schematic diagram of a network layer used to output costs according to this application.

In a process of generating a join plan, $Q_{nn}^L$ may be used to generate the join plan. After one episode (a process of generating a join plan) is completed, a latency L and costs C are collected in this embodiment of this application. For a state s in the episode, the two Q-networks use same representation information of the join state to perform computation. As shown in FIG. 11, the two Q-networks may obtain the representation information R(s) of the state s, and then compute $Q_{nn}^L(s)$ and $Q_{nn}^C(s)$ by using output layers in the two Q-networks. Losses of the two Q-networks are as follows:

$$Loss_L(R(s)) = \left(\min\left(L, \min_{(A',s')} Q_{nn}^L(R(s'), w^L)\right) - Q_{nn}^L(R(s), w^L)\right)^2;$$

and $$Loss_C(R(s)) = \left(\min\left(C, \min_{(A',s')} Q_{nn}^C(R(s'), w^C)\right) - Q_{nn}^C(R(s), w^C)\right)^2.$$

In this embodiment of this application, a weighted sum of two loss functions is calculated, to obtain a loss of the entire network.

JointLoss(R(s))=WLLOSS_(R(s))+WcLossc(R(s)).

In a cost training process, it is set that WL=0 and Wc=1. It can be learned that the latency is not used in the cost training process. During latency tuning, it is set that WL=1, and Wc=1. The costs are used to train the network, and the latency is used to find the join plan.

4. Process modification of the database schema and the multi-alias problem of the table name:

A main difference between the learning method and a conventional method lies in that the learning method requires long-time training before being applied to an actual system. Previously learned optimizers use fixed-length vectors related to a quantity of tables and columns in the database, which makes it difficult for the optimizers to handle the following (frequently existing) cases:

1. Add a column to the table;
2. Insert a table into the database;
3. A plurality of aliases: A table may have a plurality of aliases in a query statement, for example, "Select *from T as $t_1$, T as.$t_2$ . . . ", where $t_1$ and $t_2$ are aliases of a same table, and $t_1$ and $t_2$ are considered as different tables in the SQL query statement.

Adding a column and inserting a table change the schema of the database. The neural network based on a fixed-length feature needs to change a size of the network and needs to be retrained. This process takes a long time, during which the system fails. In addition, a plurality of aliases are considered as inserted tables each time. ReJoin defines a redundant location for each table, and $t_1$ and $t_2$ are considered as two completely different tables. However, information of $t_1$ and $t_2$ cannot be shared during training. Because a quantity of possible aliases cannot be predicted, when $t_3$ occurs, the ReJoin method fails.

The following shows how the model provided in this embodiment of this application uses a dynamic feature and a shared-weight feature to support these operations. Unless otherwise specified, the following model is used by default in the method provided in this embodiment of this application.

A. Encode a variable-length query statement. The foregoing embodiment of this application describes a process of representing a query statement by using an n*n matrix. When a table is inserted, n becomes n+1 and the fully connected layer becomes ineffective. This embodiment of this application explores a method for encoding a query statement. Given a query statement q, then:

$$R(q) = \sigma(vW + b) = \sigma(\Sigma v_{i*n+j=1} W_{i*n+j} + b) =$$
$$\sigma(\Sigma_{i\text{-th table join }j\text{-th table}} W_{i*n+j} + b)$$

In this embodiment of this application, the FC layer uses a vector $W_{i*n+j}$ to represent each join condition. R(q) is a sum of vectors of the join conditions in the query statement. A join set $O(q) = \{\theta_1, \theta_2, \ldots, \theta_k\}$ is a set of all k join conditions $\theta_i$ in the query statement q. A join condition consists of two columns, $\theta_i = (c_{i,0}, c_{i,1})$. Representation information of the two columns may be input into a fully connected (FC) layer, to construct representation information of the join condition: $R(\theta_i) = FC(R(c_{i,0}), R(c_{i,1}))$. W in the formula may be replaced with R ($\theta_i$):

$$R(q) = \sigma(\Sigma_{\theta_i \in \theta} FC(R(c_{i,0}), R(c_{i,1})) + b) = \sigma(R(\theta_1) + R(\theta_2) + \ldots + R(\theta_k) + b)$$

An objective of this embodiment of this application is to convert k vectors $R(\theta_i)$ of a shape of (1, hs) (i $\varepsilon$ [1, k]) into one vector of a shape of (1, hs). According to different query statements, k is a dynamically changing parameter. In this embodiment of this application, a dynamic pooling (dynamic pooling) technology is used to resolve this problem. Dynamic pooling is a pooling layer whose kernel size is determined by an expected output feature size. It is assumed that the query statement is as follows:

"Select *

From $T_1$, $T_2$, $T_3$, $T_4$ where $T_1.a = T_2.a$ and $T_2.b = T_3.b$ and $T_3.c = T_4.c$ and $T_1.d = T_3.d$".

Figure 12:
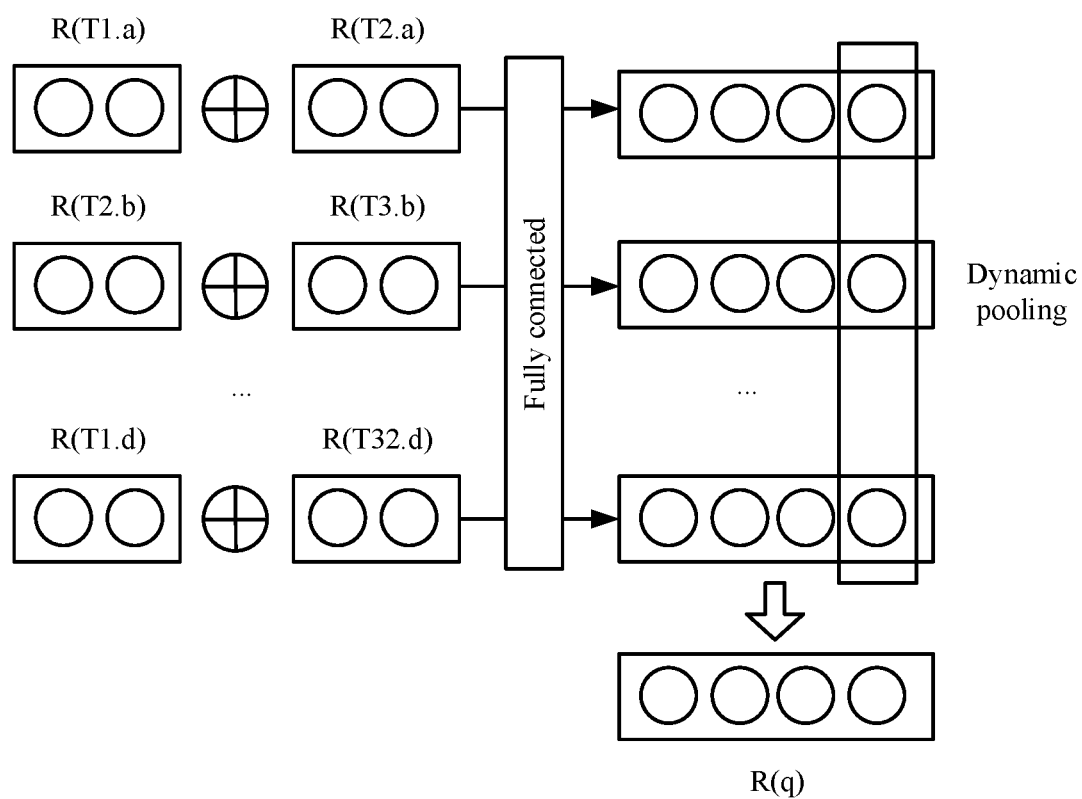
FIG. 12 is a schematic diagram of another process of generating representation information of a query request according to this application.

As shown in FIG. 12, dynamic average pooling (dynamic average pooling) may be performed on the k vectors R ($\theta_i$) to obtain a vector of a shape of (1, hs) to represent R(q).

$R(q) = \sigma(\text{DynamicPool}(R(\theta_1), R(\theta_2), \ldots, R(\theta_k)))$, where k is a quantity of joins in the query statement, and is irrelevant to the quantity n of tables in the database.

B. Add a column and insert a table.

B1. Adding a column changes a size of the table.

In this embodiment of this application, when a column $c_{new}$ needs to be added to the table t, a matrix $M(c_{new})$ may be $c_{new}$ in the neural network, and $R(c_{new})$ may be constructed by using $F(c_{new})$. The foregoing has described constructing the representation information R(t) of the table by using representation information R ($c_i$) of the k column. Adding a column changes k to k+1. Therefore, in this embodiment of this application, a simple pooling method is converted to a dynamic pooling method, to obtain R(t).

$R(t) = \text{DynamicPool}(R(c_1) \oplus R(c_2) \oplus \ldots \oplus R(c_k) \oplus R(c_{new}))$ $M(c_{new})$ can be learned for a query statement related to $c_{new}$. For another query statement that does not have $c_{new}$, $R(c_{new})$ is maintained 0, and R(t) remains the same as before.

B2. Adding a table $t_{new}$ changes a size of the database from n to n+1.

In order to construct $R(t_{new})$, a matrix $M(t_{new}, c_i)$ is first allocated to all columns $c_i$ in the table $t_{new}$. By using a dynamic feature of the tree-LSTM, a neural network in the tree-LSTM can be constructed by using a DFS method when the join tree is obtained. Any node can be added to the join tree at any time. For a query statement related to $t_{new}$, $R(t_{new})$ may be directly added to the join tree and update related parameters through the tree-LSTM.

B3. Weight initialization, or referred to as transfer learning, is an important task for reducing a training time. In this embodiment of this application, a previously known similar column (or table) may be used to initialize a parameter of the added column (or table). Herein, for a newly added column that has a join relationship with the previous column, an attribute matrix (attribute matrix) of the column may be simply initialized.

$M(c_{new}) = M(c')$.

c' and $c_{new}$ have a join relationship (for example, a foreign key (foreign key)).

C. A plurality of aliases

A plurality of aliases may mean inserting a duplicate table ($t_1$ and $t_2$) into the original table t when the query is executed. The duplicate table shares same data as the original table. More importantly, when the RL method is used for learning based on feedback, feedback of aliases $t_1$ and $t_2$ shares parameters of t in the neural network.

Shared information is used in this embodiment of this application. $t_1$ and $t_2$ share neural network parameters of t. For a feature vector of column $c_i$ in $t_1$ and $t_2$, representation information of the column is constructed by using an attribute matrix of t in this embodiment of this application.

$R(t_1.c_i) = F(t_1.c_i) * M(t.c_i)$:

$R(t_2.c_i) = F(t_2.c_i) * M(t.c_i)$.

In this embodiment of this application, representation information $R(t_1)$ of the table may be constructed by using $R(t_1. c_i)$, and representation information $R(t_2)$ of the table may be constructed by using $R(t_2. c_i)$. As the operation of inserting the table, $R(t_1)$ and $R(t_1. c_i)$ may be added to the join tree, $R(t_2)$ and $R(t_2. c_i)$ may be added to the join tree, and a required neural network is constructed when needed. Due to a sharing mechanism, feedback information $t_1$ and $t_2$ may be used for the parameters of t.

A large quantity of experiments are conducted on two popular benchmarks (benchmarks): a join order benchmark and TPC-H. The result shows that performance of the method in this embodiment of this application is superior to the existing solution by generating a join plan with a lower latency and costs.

Figures 13, 14:
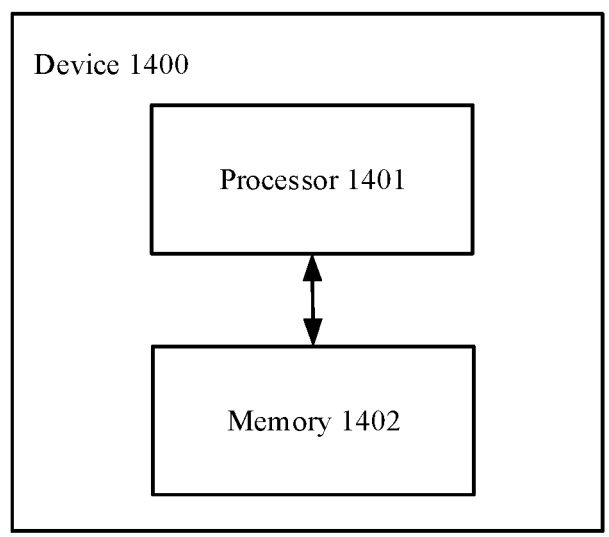
FIG. 13 compares execution times for executing plans generated by using different algorithms.
FIG. 14 is a schematic diagram of a device according to an embodiment of this application.

FIG. 13 compares geometric mean relevant latencies (geometric mean relevant latency, GMRL) of execution times of plans generated by using different algorithms. A smaller GMRL indicates lower costs of executing the plan and a better effect of the optimizer. A dynamic programming algorithm used by a conventional optimizer is used as a normalization standard value. It can be learned that the method provided in this embodiment of the present disclosure has a shorter implementation time than the conventional dynamic programming algorithm in both JOB and TPC-H test sets. The method in this application is also superior to similar deep reinforcement learning schemes such as ReJOIN and DQ.

The following describes a possible use process of the optimizer provided in this application, and may include steps in the following several phases:

(1) Cold start phase:

(1.1) Preconditions for this phase: A database system runs normally, data has been loaded, statistics information has been collected, and a user provides a large quantity of query statements similar to an actual service.

(1.2) Data collection and coding:

(1.2.1) Add a plurality of join orders through hint based on the query statements provided by the user.

Hint is a mechanism provided by an Oracle database to ask the optimizer to generate an execution plan in a manner indicated by hint.

(1.2.2) The database generates execution plans in batches for query tasks added to HINT.

(1.2.3) The foregoing coding method encodes the query statement and the join order during execution, and uses costs given by the cost prediction module or the estimator for annotation and stores the costs.

(1.3) Model training:

The system configures, based on a structure of data in the database, an LSTM-based reinforcement learning model and two networks $Q_{nn}^L$ and $Q_{nn}^C$ for predicting a Q value, and performs initialization, that is, sets a weight value of $Q_{nn}^C$ to 1 and sets a weight value of $Q_{nn}^L$ to 0. Then, the reinforcement learning model is trained by using an encoded sample and costs for labeling for the encoded sample. The reinforcement learning model is iteratively trained until the model is able to select a join order with costs that are labeled as the lowest, and cold start is completed.

(2) Hot start training phase:

(2.1) Preconditions: The database runs normally, data has been loaded, statistics information has been collected, the reinforcement learning model is initialized and converged, and the actual query statement can be executed.

(2.2) Data collection and coding:

(2.2.1) The database executes the query statement actually, generates a query plan based on dynamic programming (or a genetic algorithm) of the costs by using the optimizer, and executes the query plan.

(2.2.2) During execution, the query statement is encoded, labeled (using an actual execution time), and stored in the manner described in 1.2.3.

(2.3) Model fine tuning: Set the weight value of $Q_{nn}^C$ to 1 and set the weight of $Q_{nn}^L$ to 1. The actual execution time is used as annotation data to train the reinforcement learning model through fine-tuning. Until $Q_{nn}^L$ is converged, the reinforcement learning model can stably find a join order with a shorter query time. In some designs, the weight value of Qin may be set to 0 and the weight value of $Q_{nn}^L$ may be set to 1.

(3) Model use phase:

(3.1) Preconditions: The database runs normally, data has been loaded, statistics information has been collected, the model is calibrated and converged through fine tuning based on the actual execution time, and the actual query statement can be executed.

(3.2) Use of the model:

The database actually executes the query statement, encodes the query statement, generates a join order based on the reinforcement learning model, and executes a plan. After the execution, the database stores an actual execution time and encodes the join order: and performs fine tuning on a network based on the actual execution time.

(4) Ineffectiveness of the model:

Periodically check whether an encoding model is compatible with a data structure in a current database. If the data structure changes greatly (for example, a large quantity of user tables are added or deleted, the model becomes ineffective, or 1 is returned), the cold start phase in entered for retraining.

The foregoing describes the embodiments of this application from a perspective of a method and an entity device. The following describes, from a perspective of a functional module, a database processing apparatus provided in the embodiments of this application.

From a perspective of a functional module, in this application, division into functional modules may be performed on the apparatus performing the database processing method according to the foregoing method embodiments. For example, each functional module may be obtained through division to correspond to each function, or two or more functions may be integrated into one functional module. The integrated function module may be implemented in a form of hardware, or may be implemented in a form of a software function unit.

An embodiment of this application provides a device. As shown in FIG. 14, the device 1400 may include a memory 1402, a processor 1401, and a computer program stored in the memory 1402. When the processor 1401 executes the computer program, steps of any method embodiment provided in this application are implemented.

The processor 1401 may be a central processing unit (central processing unit, CPU). a network processor (network processor, NP), a combination of a CPU and an NP, a digital signal processor (digital signal processor, DSP), an application-specific integrated circuit (application specific integrated circuit. ASIC), a field programmable gate array (field programmable gate array, FPGA) or another programmable logic device, a discrete gate or a transistor logic device, or a discrete hardware component, and may implement or execute the methods, the steps, and logical block diagrams that are disclosed in this application. The general-purpose processor may be a microprocessor, or the processor may be any conventional processor, or the like. Steps of the methods disclosed with reference to this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with the hardware of the processor. Although only one processor is shown in the figure, the apparatus may include a plurality of processors, or the processor includes a plurality of processing units. Specifically, the processor 1401 may be a single-core processor, or may be a multi-core or many-core processor.

The memory 1402 is configured to store computer instructions executable by the processor. The memory 1402 may be a storage circuit or may be a memory. The memory 1402 may be a volatile memory or a nonvolatile memory, or may include the volatile memory and the nonvolatile memory.

The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. The memory 1402 may be independent of the processor 1401. In a possible implementation, the processor 1401 and the memory 1402 may be connected to each other by using a bus. The bus may be a peripheral component interconnect (peripheral component interconnect, PCI) bus, an extended industry standard architecture (extended industry standard architecture, EISA) bus, or the like. The bus may be classified into an address bus, a data bus, a control bus, and the like. Alternatively, the memory 1402 may be a storage unit in the processor 1401, and is directly attached (attach) to the processor 1401. This is not limited herein. Although only one memory is shown in the figure, the apparatus may include a plurality of memories 1402, or the memory 1402 includes a plurality of storage units.

Figure 15:
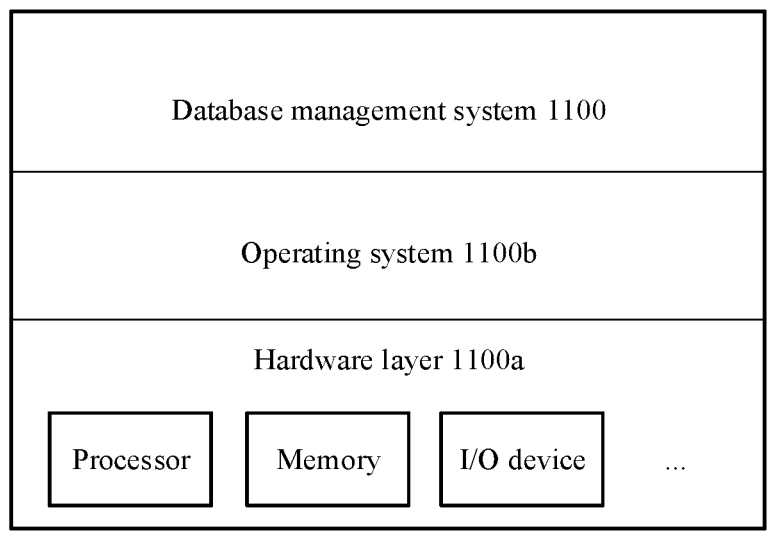
FIG. 15 is a schematic diagram of a database management system according to an embodiment of this application.

The device 1400 may be specifically the database management system 1100 in FIG. 1. With reference to FIG. 15, running of the database management system 1100 depends on a necessary software and hardware environment, including but not limited to a hardware layer 1100a and an operating system 1100b. The hardware layer 1100a includes basic hardware units required for running the operating system 1100b and the database management system 1100, for example, a processor, a memory (Memory), an input/output (I/O) device, and a network interface controller (network interface controller, NIC). The operating system 1100b is system software for managing a hardware unit, and may provide functions such as memory management and thread scheduling. A function of the database management system 1100 may be implemented by the processor by executing executable code stored in the memory. When the processor executes the executable code stored in the memory, steps of any method embodiment provided in this application can be implemented. It should be understood that, in the embodiments of the present disclosure, an "executable program" should be broadly construed to including, but is not limited to, instructions, an instruction set, code, a code segment, a subprogram, a software module, an application, a software package, a thread, a process, a function, firmware, middleware, or the like.

It should be understood by a person skilled in the art that, a database system may include fewer or more components than those shown in FIG. 15, or may include components that are different from those shown in FIG. 15. FIG. 15 only shows components that are more relevant to the implementations disclosed in embodiments of the present disclosure.

All or some of the foregoing embodiments may be implemented by using software, hardware, firmware, or any combination thereof. When the software is used for implementation, all or some of the embodiments may be implemented in a form of a computer program product.

The computer program product includes one or more computer instructions. When the computer-executable instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have", and any other variants thereof are intended to cover the non-exclusive inclusion, so that a process, method, system, product, or device that includes a series of units is not necessarily limited to those units, but may include other units not expressly listed or inherent to such a process, method, product, or device. In the embodiments of this application, "a plurality of" means two or more than two.

In the embodiments of this application, words such as "example" or "for example" are used to represent giving an example, an illustration, or a description. Any embodiment or design scheme described as "example" or "for example" in the embodiments of this application should not be explained as being more preferred or having more advantages than another embodiment or design scheme. Specifically, use of "example" and "for example" is intended to present a relative concept in a specific manner.

In the embodiments of this application, for ease of understanding, a plurality of examples are used for description. However, these examples are merely examples. It does not mean that these examples are best implementations for implementing this application.

The technical solutions provided in this application are described in detail above. The principle and implementation of this application are described herein by using specific examples. The description about the embodiments is merely provided to help understand the method and core ideas of this application. In addition, a person of ordinary skill in the art can make variations and modifications to this application in terms of the specific implementations and application scopes based on the ideas of this application. Therefore, the content of this specification shall not be construed as a limitation to this application.

What is claimed is:

1. A database processing method, comprising:
obtaining a tree structure used to represent a join order of one or more join operations on a plurality of original tables in a database, the join order is determined based on a query request for operating data in the database, the tree structure comprises a first join tree, and the first join tree represents one or more join operations for joining at least two original tables in the plurality of original tables;

inputting the tree structure into a neural network, wherein the neural network comprises a first feature extraction layer and a cost prediction layer;

allocating, by the first feature extraction layer, a first attribute matrix to each child node based on a location of each child node in the first join tree, and performing feature extraction on the first join tree based on the first attribute matrix allocated to each child node in the first join tree, to obtain representation information of the first join tree, wherein the first attribute matrix is obtained by the first feature extraction layer in a training process; and predicting, by the cost prediction layer based on representation information of the tree structure, costs of executing the query request according to a first plan, and outputting the predicted costs, wherein the first plan is generated based on the join order, and the representation information of the tree structure is determined based on the representation information of the first join tree;

wherein the tree structure is a partially connected tree structure, and the method further comprises:
  determining a minimum-cost connection order of the partially connected tree structure based on the predicted costs output by the neural network;
  adding one or more connection operations based on the minimum-cost connection order to update the partially connected tree structure, until the partially connected tree structure is updated to a fully connected tree structure;
  determining a minimum-cost connection sequence of the fully connected tree structure as a target connection sequence;
  generating a second plan based on the target connection sequence; and
  obtaining a query result of the query request by executing the second plan.

2. The method according to claim 1, wherein the first join tree comprises a plurality of parent nodes, each parent node in the plurality of parent nodes corresponds to one join operation in the one or more join operations, and a first parent node in the plurality of parent nodes represents a join table obtained using a first join operation; and
  a first child node of the first parent node represents a table joined using the first join operation, and if the first child node is a leaf node, the first child node represents an original table in the at least two original tables.

3. The method according to claim 2, wherein a first join condition in the query request indicates a condition that needs to be satisfied for a first column in an original table joined using the first join operation, a second child node of the first parent node is used to represent the first column, and the second child node is a leaf node.

4. The method according to claim 2, wherein the performing, by the first feature extraction layer, feature extraction on the first join tree based on the first attribute matrix allocated to each child node in the first join tree, to obtain representation information of the first join tree comprises:
  obtaining, by the first feature extraction layer, the representation information of the first join tree based on the first attribute matrix allocated to each child node in the first join tree and representation information of each leaf node in the first join tree, wherein the first attribute matrix allocated by the first feature extraction layer to the first child node is different from the first attribute matrix allocated to a brother node of the first child node.

5. The method according to claim 4, wherein the obtaining, by the first feature extraction layer, the representation information of the first join tree based on the first attribute matrix allocated to each child node in the first join tree and representation information of each leaf node in the first join tree comprises:
  obtaining, by the first feature extraction layer in a descending order of heights of the parent nodes in the first join tree, representation information of each parent node based on representation information of each child node of each parent node in the first join tree and the first attribute matrix allocated to each child node, and
  wherein representation information of a root node in the first join tree is the representation information of the first join tree.

6. The method according to claim 4, wherein the at least two original tables comprise a first table, and representation information of the first table is generated based on representation information of each column in the first table.

7. The method according to claim 1, wherein the tree structure further comprises a second join tree: a root node of the second join tree is used to represent one of an original table other than the at least two original tables in the plurality of original tables, or a join table obtained by joining original tables other than the at least two original tables in the plurality of original tables; and the second join tree is not joined to the first join tree; and
  the neural network further comprises a second feature extraction layer, and the method further comprises:
  after the first feature extraction layer obtains the representation information of the first join tree, allocating, by the second feature extraction layer, a same second attribute matrix to each of representation information of the second join tree and the representation information of the first join tree; and performing feature extraction on the representation information of the second join tree and the representation information of the first join tree, to obtain the representation information of the tree structure, wherein the second attribute matrix is obtained by the second feature extraction layer in a training process.

8. The method according to claim 7, wherein the predicting, by the cost prediction layer based on representation information of the tree structure, costs of executing the query request according to a first plan comprises:
  predicting, by the cost prediction layer based on the representation information of the tree structure and representation information of the query request, the costs of executing the query request according to the first plan.

9. The method according to claim 8, wherein the representation information of the query request is determined based on representation information of a join condition in the query request.

10. The method according to claim 9, wherein a second join condition is any one of join conditions of the one or more join operations, and representation information of the second join condition is determined based on representation information of a column indicated by the second join condition.

11. The method according to claim 6, wherein a second column is any column in any original table in the at least two original tables, and representation information of the second column is obtained based on a feature vector of the second column; and the feature vector of the second column is used to indicate whether the second column is a column indicated by the join condition in the query request.

12. The method according to claim 11, wherein the query request is further used to indicate to perform a select operation on one or more original tables in the plurality of original tables based on a selection condition, and the feature vector of the second column is further used to represent the selection condition that needs to be satisfied for the first column.

13. The method according to claim 1, wherein the cost prediction layer comprises a first cost prediction layer and a second cost prediction layer:
the predicting, by the cost prediction layer based on representation information of the tree structure, costs of executing the query request according to a first plan, and outputting the predicted costs comprises:
obtaining and outputting, by the first cost prediction layer, first costs based on the representation information of the tree structure, wherein annotation information of a training sample used by the first cost prediction layer is costs obtained by a cost prediction model; and
obtaining and outputting, by the second cost prediction layer, second costs based on the representation information of the tree structure, wherein annotation information of a training sample used by the second cost prediction layer is costs obtained by executing a plan corresponding to the training sample; and
after the cost prediction layer outputs the first costs and the second costs, the method further comprises:
determining, based on the first costs and the second costs, third costs of executing the query request according to the first plan.

14. A computer device, comprising a processor and a memory, wherein when running computer instructions stored in the memory, the processor is configured to invoke the instructions to:
obtain a tree structure used to represent a join order of one or more join operations on a plurality of original tables in a database, the join order is determined based on a query request for operating data in the database, the tree structure comprises a first join tree, and the first join tree represents one or more join operations for joining at least two original tables in the plurality of original tables;
input the tree structure into a neural network, wherein the neural network comprises a first feature extraction layer and a cost prediction layer;
allocate, by the first feature extraction layer, a first attribute matrix to each child node based on a location of each child node in the first join tree, and perform feature extraction on the first join tree based on the first attribute matrix allocated to each child node in the first join tree, to obtain representation information of the first join tree, wherein the first attribute matrix is obtained by the first feature extraction layer in a training process; and
predict, by the cost prediction layer based on representation information of the tree structure, costs of executing the query request according to a first plan, and output the predicted costs, wherein the first plan is generated based on the join order, and the representation information of the tree structure is determined based on the representation information of the first join tree;
wherein the tree structure is a partially connected tree structure, and the processor is configured to further invoke the instructions to:

determine a minimum-cost connection order of the partially connected tree structure based on the predicted costs output by the neural network;
add one or more connection operations based on the minimum-cost connection order to update the partially connected tree structure, until the partially connected tree structure is updated to a fully connected tree structure;
determine a minimum-cost connection sequence of the fully connected tree structure as a target connection sequence;
generate a second plan based on the target connection sequence; and
obtain a query result of the query request by executing the second plan.

15. The computer device according to claim 14, wherein the first join tree comprises a plurality of parent nodes, each parent node in the plurality of parent nodes corresponds to one join operation in the one or more join operations, and a first parent node in the plurality of parent nodes represents a join table obtained using a first join operation; and
a first child node of the first parent node represents a table joined using the first join operation, and if the first child node is a leaf node, the first child node represents an original table in the at least two original tables.

16. The computer device according to claim 15, wherein a first join condition in the query request indicates a condition that needs to be satisfied for a first column in an original table joined using the first join operation, a second child node of the first parent node is used to represent the first column, and the second child node is a leaf node.

17. The computer device according to claim 15, wherein the performing, by the first feature extraction layer, feature extraction on the first join tree based on the first attribute matrix allocated to each child node in the first join tree, to obtain representation information of the first join tree comprises:
obtaining, by the first feature extraction layer, the representation information of the first join tree based on the first attribute matrix allocated to each child node in the first join tree and representation information of each leaf node in the first join tree, wherein the first attribute matrix allocated by the first feature extraction layer to the first child node is different from the first attribute matrix allocated to a brother node of the first child node.

18. The computer device according to claim 17, wherein the obtaining, by the first feature extraction layer, the representation information of the first join tree based on the first attribute matrix allocated to each child node in the first join tree and representation information of each leaf node in the first join tree comprises:
obtaining, by the first feature extraction layer in a descending order of heights of the parent nodes in the first join tree, representation information of each parent node based on representation information of each child node of each parent node in the first join tree and the first attribute matrix allocated to each child node,
wherein representation information of a root node in the first join tree is the representation information of the first join tree.

19. The computer device according to claim 17, wherein the at least two original tables comprise a first table, and representation information of the first table is generated based on representation information of each column in the first table.

20. The computer device according to claim 14, wherein the tree structure further comprises a second join tree; a root node of the second join tree is used to represent one of an original table other than the at least two original tables in the plurality of original tables, or a join table obtained by joining original tables other than the at least two original tables in the plurality of original tables; and the second join tree is not joined to the first join tree; and wherein the neural network further comprises a second feature extraction layer, and the processor is configured to further invoke the instructions to:

after the first feature extraction layer obtains the representation information of the first join tree, allocate, by the second feature extraction layer, a same second attribute matrix to each of representation information of the second join tree and the representation information of the first join tree; and perform feature extraction on the representation information of the second join tree and the representation information of the first join tree, to obtain the representation information of the tree structure, wherein the second attribute matrix is obtained by the second feature extraction layer in a training process.

\* \* \* \* \*

UNITED STATES PATENT AND TRADEMARK OFFICE
CERTIFICATE OF CORRECTION

PATENT NO. : 12,056,125 B2
APPLICATION NO. : 17/860906
DATED : August 6, 2024
INVENTOR(S) : Li et al.

Page 1 of 1

It is certified that error appears in the above-identified patent and that said Letters Patent is hereby corrected as shown below:

In the Claims

Claim 5, Column 38, Line 12: "first attribute matrix allocated to each child node, and" should read -- first attribute matrix allocated to each child node, --.

Claim 13, Column 40, Line 13: "second cost prediction layer:" should read -- second cost prediction layer; --.

Signed and Sealed this
Twenty-seventh Day of May, 2025

Coke Morgan Stewart
*Acting Director of the United States Patent and Trademark Office*